(12) United States Patent
Lee

(10) Patent No.: US 12,221,190 B2
(45) Date of Patent: Feb. 11, 2025

(54) HUB TYPE DRIVING DEVICE AND ELECTRIC BICYCLE USING SAME

(71) Applicant: AMOTECH CO., LTD., Incheon (KR)

(72) Inventor: Jeong Hoon Lee, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 836 days.

(21) Appl. No.: 17/433,487

(22) PCT Filed: Feb. 25, 2020

(86) PCT No.: PCT/KR2020/002682
§ 371 (c)(1),
(2) Date: Aug. 24, 2021

(87) PCT Pub. No.: WO2020/175882
PCT Pub. Date: Sep. 3, 2020

(65) Prior Publication Data
US 2022/0135179 A1    May 5, 2022

(30) Foreign Application Priority Data
Feb. 28, 2019 (KR) .................. 10-2019-0024359

(51) Int. Cl.
*B62M 6/65* (2010.01)
*B62M 11/16* (2006.01)

(52) U.S. Cl.
CPC .............. *B62M 6/65* (2013.01); *B62M 11/16* (2013.01)

(58) Field of Classification Search
CPC .................................. B62M 6/60; B62M 6/65
See application file for complete search history.

(56) References Cited

U.S. PATENT DOCUMENTS

| 2014/0145542 A1* | 5/2014 | Kanazawa | H02K 1/148 |
| | | | 310/203 |
| 2015/0148173 A1* | 5/2015 | Kim | B62M 6/65 |
| | | | 475/149 |

(Continued)

FOREIGN PATENT DOCUMENTS

| JP | 2012096775 | 5/2012 |
| JP | 2012122501 | 6/2012 |

(Continued)

OTHER PUBLICATIONS

International Search Report—PCT/KR2020/002682 dated Jun. 5, 2020.

*Primary Examiner* — Christopher B Wehrly
(74) *Attorney, Agent, or Firm* — CANTOR COLBURN LLP

(57) ABSTRACT

Provided is a hub type driving device applicable to an electric bicycle of a throttle mode, a PAS mode, and a throttle and PAS combination mode, and an electric bicycle using same. The hub type driving device comprises: a housing having an accommodation space therein; a support shaft for penetrating to pass through the housing and of which both ends are fixed to a fork of the electric bicycle; first and second bearings for rotatably supporting the housing around the support shaft; an electric motor for generating a rotational force rotated around the support shaft; a derailleur for decelerating the rotational force of the electric motor; and a clutch for selectively transmitting an output of the derailleur to the housing. The derailleur is formed of a planetary gear device of a sun gear input, a carrier fixation, and a ring gear output mode.

11 Claims, 18 Drawing Sheets

(56) References Cited

U.S. PATENT DOCUMENTS

2018/0111487 A1* 4/2018 Xu ........................ H02K 7/108
2019/0112002 A1* 4/2019 Kim ........................ B62M 6/65

FOREIGN PATENT DOCUMENTS

| KR | 20100135488 | 12/2010 |
| KR | 20130107502 | 10/2013 |
| KR | 20160074765 | 6/2016 |
| KR | 20180097290 | 8/2018 |

\* cited by examiner

HUB TYPE DRIVING DEVICE AND ELECTRIC BICYCLE USING SAME

TECHNICAL FIELD

The present invention relates to an electric bicycle, and more particularly, to a hub type driving device which can be applied to an electric bicycle having a throttle mode, a pedal assist system (PAS) mode, and a throttle and PAS combination mode, and an electric bicycle using same.

BACKGROUND ART

An electric bicycle is equipped with a direct-current (DC) motor on a wheel hub or a crank shaft of a general bicycle to assist power, thereby enabling pleasant driving in a flatland and an uphill road.

The criteria of the applied range of electric bicycles refer to a two-wheeled bicycle equipped with electric motor power to supplement the power of a rider. The electric bicycle has essentially a pedal driving function and is classified as follows according to a driving method while referring to a bicycle moving with electric motor power.

First, a throttle mode: A bicycle which operates an electric bicycle accelerator lever to move with only the power of an electric motor.

Second, a pedal assist system (PAS) mode: A bicycle that is moved by simultaneous power of an electric bicycle pedal and an electric motor.

Third, a throttle/PAS combination mode: A bicycle supporting both a throttle mode and a PAS mode of an electric bicycle.

The throttle mode electric bicycle can control the speed of the bicycle from a low speed to a high speed by controlling the rotational force of the motor by manipulating an accelerator. The driving mode by the accelerator is referred to as a scooter mode.

A pedal assistance system (PAS) mode electric bicycle, employs a PAS mode for automatically rotating a motor by sensing a pedal when the pedal is driven. A torque sensor measures a pedal effort applied to a pedal by a bicycle driver and provides the calculated torque information to an electric bicycle controller. As the pedal effort applied to the pedal increases, the output of the motor also increases. The driver can actively control the DC motor output of the electric bicycle by adjusting the pedal effort applied to the pedal by the driver.

Like the general motors, the efficiency of the hub type motor having the motor built in the hub decreases rapidly when the rotational speed is lowered, and thus the driving capability of the electric bicycle is deteriorated. Therefore, in order to improve the driving force at low speed, a derailleur is required. A hub type motor having both a derailleur and a motor in a hub is recently under development.

The derailleur generally changes only the input of the motor and does not change the speed if a load is applied to a speed shift control unit when the bicycle is driven by the operation of the motor or the pedal.

The input of the motor and the input of the pedal are received by one derailleur, and it is not easy to immediately convert the input of the motor or pedal into a desired speed shift stage even while the motor or the pedal is being driven.

A speed shift method, which can be applied to an electrical bicycle and a hub embedded derailleur of a general bicycle by solving a defect of the conventional technique, in which both motor-side input and pedal-side input are transmitted and s load is generated in a speed shift device and a current speed shift stage is not converted to a selected shift stage, has been proposed in Korean Patent Application Laid-open Publication No. 10-2010-0135488 (Patent document 1).

Patent document 1 discloses a motor and pedaling combined speed shift method which respectively or simultaneously shifts, by a speed shift device built in a hub shell, the power driven by the motor built into the hub shell, and the power input to a sprocket separately mounted on the outer side of the hub shell and driven by the pedaling of a rider, in which both a motor and the speed shift device are provided within the hub shell of a wheel.

The derailleur of Patent document 1 can freely convert input power of a motor and a pedal from a low speed to a high speed through a speed shift device, and can receive both a motor-side input and a pedal-side input even though the derailleur is being operated or not operated.

However, the derailleur of Patent document 1 has a complex speed shift gear structure in which a three-speed shift is performed, thereby having a large volume and a complicated structure to cause a high manufacturing cost, and does not adopt a PAS mode in which a speed shift of a fixed ratio is performed.

The PAS mode with a speed shift of a fixed ratio using a clutch consisting of a single one-way bearing is provided with a mode of 3 to 5 stages, and provides appropriate power for each mode according to a road driving environment.

The total five-stage pedal assist system (PAS) may be configured in an eco-mode, for example, starting in an OFF mode completely blocking support of a motor, and supporting a long-range support, a tour mode supporting a uniform assist, a sports mode with relatively strong power, and a turbo mode supporting the largest power.

However, the conventional PAS mode driving device with the speed shift of the fixed ratio using a single clutch has a structure for generating the torque shifted output at a fixed ratio from a ring gear by applying the power of a single motor to a planetary gear set of a sun gear input, a carrier fixation, and a ring gear output.

The conventional PAS driving device has a structure in which a ring gear is directly coupled to a driving device housing and a clutch formed of a one-way bearing is inserted into a carrier when an output is generated to the ring gear through the planetary gear by receiving the rotational driving force by the sun gear.

In this case, when the motor is driven, the ring gear is rotated due to the gear deceleration of the planetary gear set, and the bicycle should be advanced in the forward direction even when the motor is stopped.

The conventional PAS mode has a structure in which the ring gear is directly coupled to the housing and the clutch is inserted into the carrier, and the clutch is fixed to the shaft. Therefore, when the driving device housing rotates in the forward direction when the motor is stopped, the ring gear and the planetary gear rotate, the sun gear also rotates and a rotor also rotates. In this case, when the rotor of the motor rotates according to the rotation of the ring gear, the rotor acts as a load and undesirably serves as a brake.

As a result, conventionally, it is designed that the clutch is inserted into the carrier for preventing the sun gear from being driven at the time of rotation of the planetary gear, and thus the carrier is rotated.

However, when the bicycle is advanced in the forward direction when the motor is stopped, noise is generated in accordance with the rotation of the ring gear and the planetary gear while the driving device housing is rotated, and since the rotation ratio of the ring gear and the planetary gear is not 1:1, the rotation and stopping are repeated, thereby causing damage to the planetary gear manufactured by the synthetic resin.

DISCLOSURE

Technical Problem

The present invention is devised in consideration of this conventional problem, and an objective of the present invention is to provide a hub type driving device and an electric bicycle using same, wherein a ring gear and a housing are separated from each other, and a clutch formed of a one-way bearing is connected between the ring gear bracket and a clutch fixing unit protruding from the housing, to thereby transmit a ring gear output to the housing only when the electric motor is operated, and block the ring gear output from being transmitted to the housing when the electric motor is stopped.

Another objective of the present invention is to provide a hub type driving device and an electric bicycle using same, which can minimize the gear from being damaged or noise from being caused by blocking the rotation of the ring gear when the housing is rotated due to the advancement of the bicycle in a motor stop state.

Another objective of the present invention is to provide a hub type driving device and an electric bicycle using same, which can support all of a throttle mode, a PAS mode, and a throttle and PAS combination mode, and perform a speed shift of a fixed ratio.

Another objective of the present invention is to provide a hub type driving device capable of making coil windings without a connection portion between coils as all the coil windings are continuous at a time, when winding a three-phase coil on the teeth of an integrated stator core by means of a three-wire connection method.

Another objective of the present invention is to provide a hub type driving device capable of realizing high-speed round-per-minute (RPM) by lowering the coil temperature and increasing the efficiency, and securing the number of turns of thin diameter wires in a two-strand winding manner, by reducing resistance and coil loss by minimizing resistance of coils due to parallel connection between each core group when coils are wound by a three-wire connection method.

Technical Solution

According to an embodiment of the present invention, there is provided a hub type driving device for an electric bicycle, the hub type driving device comprising: a housing having an accommodation space therein; a support shaft for penetrating so as to pass through the housing and of which both ends are fixed to a fork of the electric bicycle; first and second bearings which are installed between both ends of the housing through which the support shaft penetrates and rotatably supports the housing around the support shaft; an electric motor which is embedded in the housing and generates a rotational force rotated around the support shaft; a derailleur for decelerating the rotational force of the electric motor; and a clutch for selectively transmitting an output of the derailleur to the housing, wherein the derailleur is formed of a planetary gear device of a sun gear input, a carrier fixation, and a ring gear output mode, wherein one end of a ring gear bracket is coupled to the ring gear, and the ring gear is coupled to the clutch through another end of the ring gear bracket, and the clutch is formed by a one-way bearing having an outer ring supported on the other end of the ring gear bracket and an inner ring supported on a clutch fixing portion protruding from the housing.

According to the hub type driving device for an electric bicycle, the ring gear and the ring gear bracket are separated from the housing, and the clutch transmits an output of the ring gear bracket to the housing when the electric motor is operated, and blocks the transmission of the forward rotational force of the housing to the ring gear bracket when the electric motor is stopped.

In addition, the electric motor is composed of an outer rotor type brushless direct-current (BLDC) motor, an output of the rotor is transmitted to a sun gear of the planetary gear device through a rotor bracket, the sun gear is rotatably supported on the support shaft, and the carrier is fixed to the support shaft.

The planetary gear device comprises: a sun gear connected to a rotor of the electric motor; a plurality of planetary gears that are engaged with the outer circumference of the sun gear and rotate; a carrier for rotatably supporting the plurality of planetary gears, respectively; a ring gear in which the plurality of planetary gears are inscribed; and a ring gear bracket having one end connected to the outer circumference of the ring gear and another end connected to the clutch, wherein the sun gear is rotatably supported on the support shaft, and the carrier is fixed to the support shaft.

The housing comprises: a wheel formed in a cup shape so as to have an accommodation space therein; and a cover having an outer circumferential portion that is coupled to an opening portion of the wheel, the clutch fixing portion is formed of a cylindrical portion protruding into the accommodation space of the wheel, an inner ring of the one-way bearing is supported on the outer circumferential portion of the clutch fixing portion, and a second bearing is mounted between the inner circumferential portion of the clutch fixing portion and the support shaft.

According to the hub type driving device for an electric bicycle, the first and second bearings are installed inside each of through-holes formed at the center of the wheel and the cover, respectively, and an O-ring is installed between each of the first and second bearings and the supporting shaft.

In the hub type driving device for an electric bicycle, according to the present invention, when the electric bicycle is an electric bicycle of a pedal assist system (PAS) mode, the electric motor comprises: a torque sensor installed on a crank shaft to detect a pedal effort applied to a pedal; a housing sensing magnet installed in the housing to be used for detecting the driving speed of the electric bicycle; a Hall sensor assembly installed in a stator of the electric motor and having a Hall sensor for detecting rotation of the housing sensing magnet rotated together with the housing to generate a driving speed detection signal; and a system controller for controlling a system of the electric bicycle according to a user's selection, wherein the system controller controls the electric motor so that the driving speed calculated on the basis of the driving speed detection signal does not exceed a predetermined speed.

the electric motor comprises: a rotor with back yokes and magnets are stacked on the outer ring of the rotor bracket; and a stator having an outer circumferential portion facing the magnet of the rotor via an air gap and having a central portion coupled to the outer circumference of the support shaft to be fixed, and applying a rotating magnetic field to the rotor, wherein an inner ring of the rotor bracket is connected to an extension portion extending from the sun gear.

The hub type driving device for an electric bicycle, according to the present invention, further comprises third and fourth bearings for rotatably supporting the rotor bracket and the sun gear around the support shaft between the inner circumferential portion of the extension portion and the support shaft.

The stator comprises: a stator core in which a plurality of teeth are radially extended on the outer circumference of an annular yoke; an insulating film surrounding four sides of the plurality of teeth except an outer circumferential surface opposite to the magnet of the rotor; first and second stator insulators having an annular body and a plurality of extension portions radially extending from the annular body so as to correspond to the plurality of teeth and the annular yoke, respectively, and assembled to one side and the other side of the stator core; a stator coil wound around a teeth portion surrounded by the insulating film and the first and second stator insulators; and a stator assembly bracket having an outer ring coupled to an inner circumferential portion of the stator core and an inner ring connected through a plurality of bridges, the inner ring coupled to the support shaft. In this case, the stator core and the stator assembly bracket may be integral.

In addition, the stator includes three-phase (U, V, W) stator coils wound on the plurality of teeth, wherein each of the three-phase (U, V, W) stator coils includes a plurality of core groups that are continuously wound on three teeth; and the core groups on each phase are connected in parallel and are alternately arranged for each phase.

Further, the electric motor includes a 20-pole single rotor and a single stator having an 18-slot structure; the stator includes three-phase (U, V, W) stator coils wound on the plurality of teeth, and each of the three-phase (U, V, W) stator coils includes a plurality of core groups wound continuously in three teeth, wherein each of the core groups is continuously wound in a sequence of forward, backward, and forward directions in three consecutive teeth, and six consecutive teeth of two adjacent phases generate magnetic flux in opposite directions to rotate the magnets of the opposite rotors in the same direction; and when a driving signal is applied to the stator coil in a 6-step control manner, the six consecutive teeth of two phases are set to a consecutive state, and three consecutive teeth on the remaining one phase arranged between the activated six teeth are set to an inactive state.

Further, the electric motor includes a 20-pole single rotor and a single stator having an 18-slot structure; the stator includes three-phase (U, V, W) stator coils wound on eighteen teeth, and each of the three-phase (U, V, W) stator coils includes six core groups wound continuously in three teeth, wherein the three-phase (U, V, W) stator coils wound around the eighteen teeth is completely wound with a one-time continuous winding, the input of the core group on each phase may be commonly connected, and the output of the core group on each phase may be wound to be connected to a neutral point.

According to an embodiment of the present invention, there is provided an electric bicycle comprising: a frame; a front wheel connected to one end of the frame; a rear wheel connected to another end of the frame; and a hub type driving device that is installed on one hub of the front and rear wheels to provide a rotational driving force for the wheels.

The hub type driving device of the present invention can be applied to an electric bicycle having a throttle mode, a pedal assist system (PAS) mode, and a throttle and PAS combination mode.

Advantageous Effects

As described above, according to the present invention, a ring gear and a housing are separated from each other, and a clutch formed of a one-way bearing is connected between a ring gear bracket and a clutch fixing unit protruding from the housing, to thereby transmit a ring gear output to the housing only when an electric motor is operated, and block the ring gear output from being transmitted to the housing when the electric motor is stopped.

In addition, in the present invention, when the bicycle is advanced in the forward direction by the user's pedaling while the motor is stopped, that is, even when the housing is rotated forward at a high speed, the rotation of the ring gear can be prevented, thereby minimizing the damage to the gear or the generation of noise.

Moreover, the driving device of the present invention can support all of a throttle mode, a PAS mode, and a throttle and PAS combination mode, and a shift of a fixed ratio is achieved.

The present invention provides a hub type driving device capable of making coil windings without a connection portion between coils as all the coil windings are continuous at a time, when winding a three-phase coil on the teeth of an integrated stator core by means of a three-wire connection method.

The present invention may implement a hub type driving device capable of realizing high-speed round-per-minute (RPM) by lowering the coil temperature and increasing the efficiency, and securing the number of turns of thin diameter wires in a two-strand winding manner, by reducing resistance and coil loss by minimizing resistance of coils due to parallel connection between each core group when coils are wound by a three-wire connection method.

BEST MODE

Figure 1:
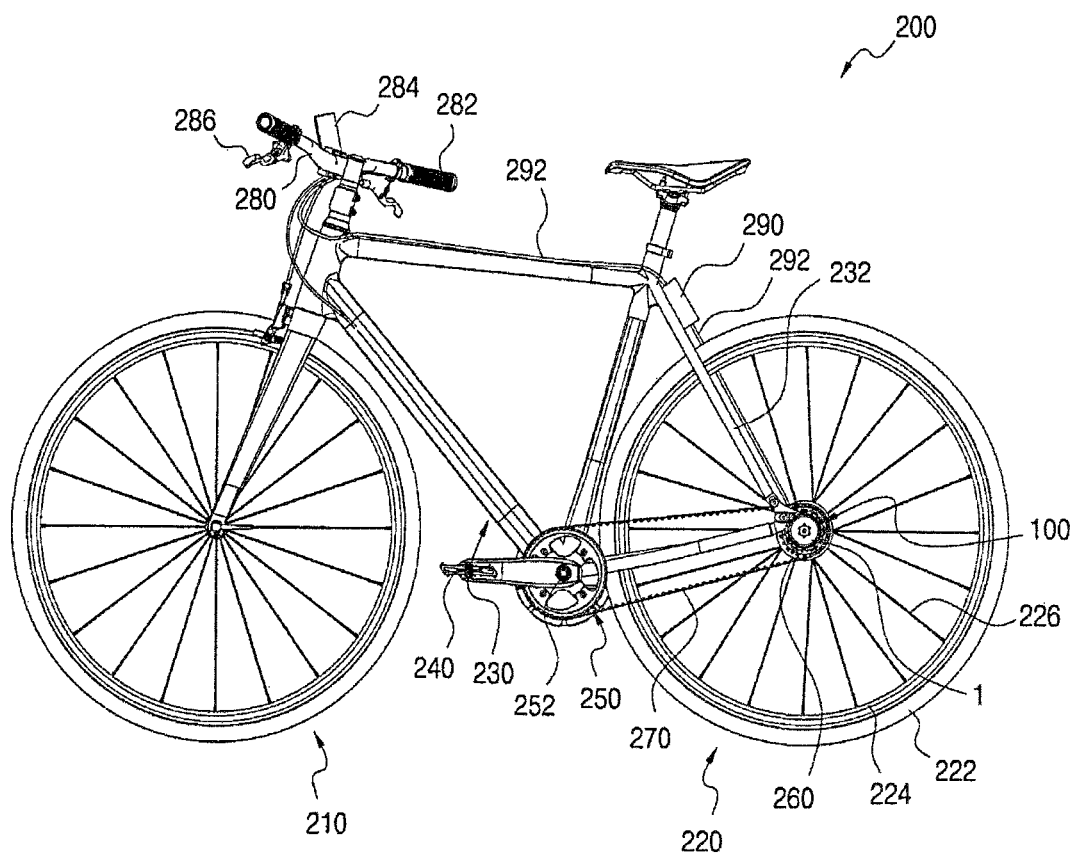
FIG. 1 is a schematic front view showing an electric bicycle in which a hub type driving device for the electric bicycle according to the present invention is applied to a rear wheel.
Figure 2A:
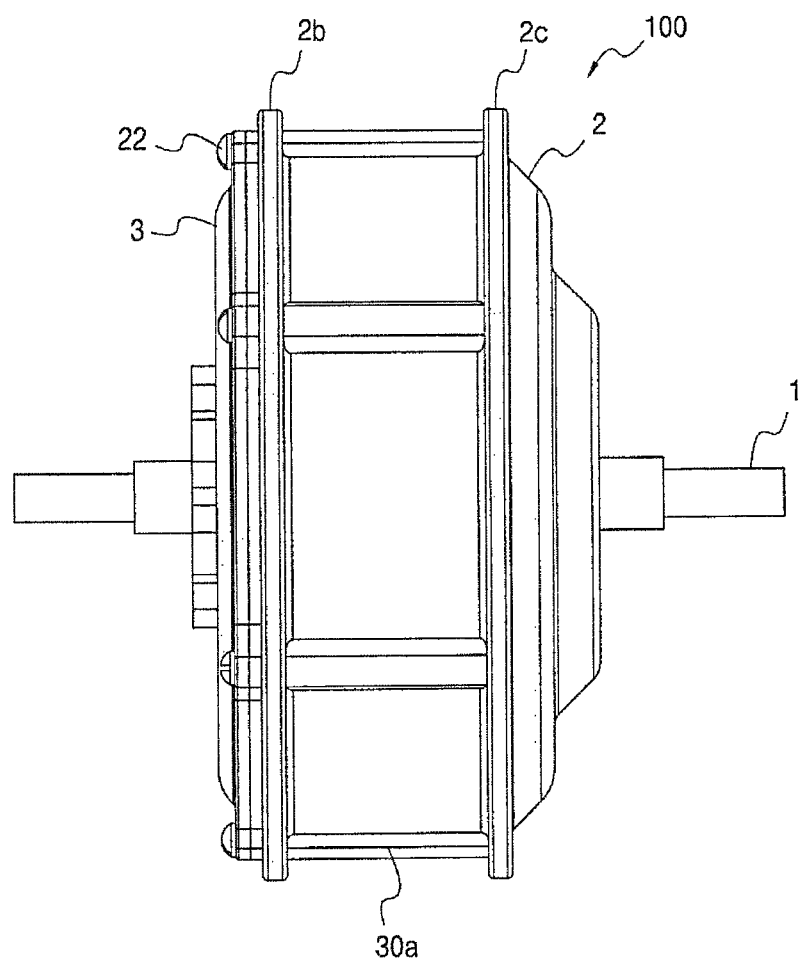
FIGS. 2A and 2B are a front view and a left side perspective view of a hub type driving device for an electric bicycle according to the present invention, respectively.
Figure 2B:
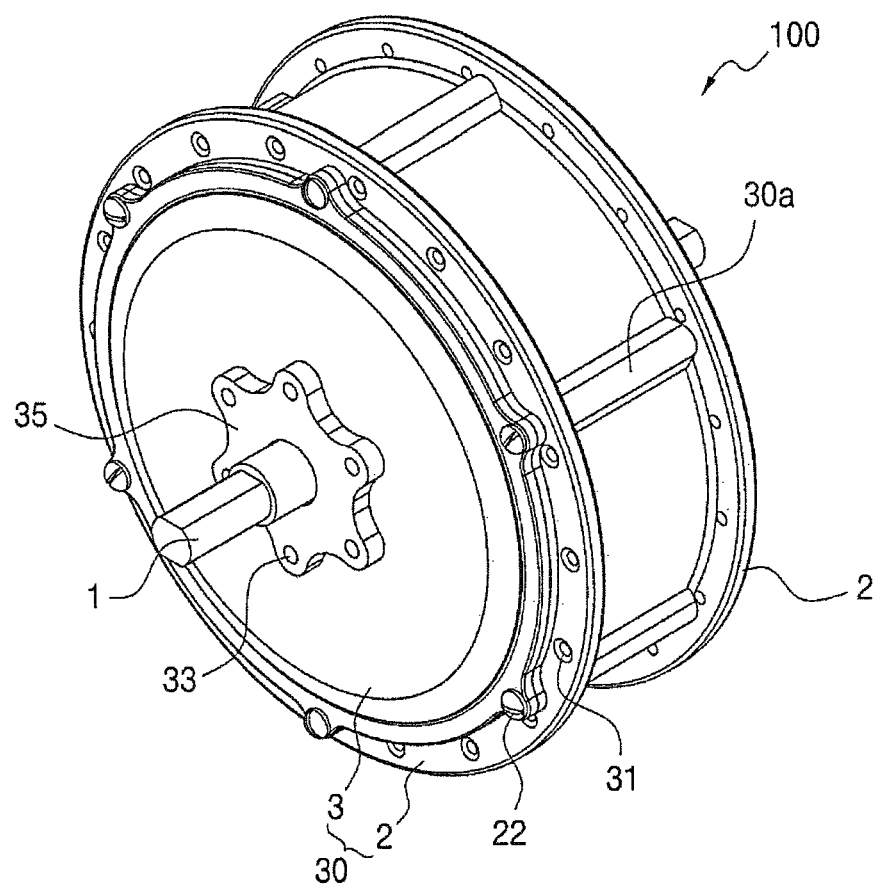

Hereinafter, preferred embodiments of the present invention will be described in detail with reference to the accompanying drawings.

The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

Referring to FIG. 1, an electric bicycle 200 according to the present invention has a hub type driving device 100 mounted on a hub of a rear wheel 220.

The electric bicycle 200 according to the present invention is similar to the general bicycle, and a front wheel 210 and a rear wheel 220 are connected to a basic diamond-shaped frame 230. When used as a general bicycle, the rear wheel 220 on which a free wheel 260 is installed may be driven by a pedal effort applied to a pedal 240 through a chain 270 connected between a large gear 250 and a free wheel 260.

The hub type driving device 100 for an electric bicycle according to the present invention may be installed on the hub of the rear wheel 220 or the front wheel 210 of the electric bicycle.

A support shaft 1 of the driving device 100 has both ends connected to a fork 232 branched from a frame 230, and the hub type driving device 100 according to the present invention is installed in the hub of the rear wheel 220. The free wheel 260 may be installed on the outer surface of a cover 3 or a wheel 2 forming a housing 30 of the driving device 100, which will be described later, and a multi-stage sprocket may be installed as an external derailleur on the free wheel 260 to change the gear ratio.

A torque sensor for measuring the pedal effort of the user can be installed in a crank shaft 252 of a crank forming the large gear 250.

On one side of a handle 280 connected to the frame 230, an accelerator 282 provided in the case that an electric bicycle employs a throttle mode, is installed. A brake lever 286 is installed at the other side of the handle 280, and an operation panel 284 may be installed at a central portion of the handle 280. The operation panel 284 may be configured to select a switch such as a mode selection switch, a light turn-on/turn-off switch, etc. to change a driving mode in a touch manner, and may include a display unit for displaying a driving speed, a selected mode, and the like.

In addition, a system controller 290 for controlling the driving device 100 according to the manipulation and selection of the user in the operation panel 284 is connected to the frame 230 via a cable 292.

Referring to FIGS. 2A to 10, the hub type driving device 100 for an electric bicycle according to the present invention includes the housing 30, the support shaft 1, first to fourth bearings 6a to 6d, an electric motor 110 having a rotor 50 and a stator 40, a derailleur 120, and a clutch 5.

The hub type driving device 100 for an electric bicycle according to the present invention is configured to include, as shown in FIG. 1, the electric motor 110 for generating rotational power as a power source in the housing 30, in which the support shaft 1 is not rotated, and both ends of the support shaft 1 are fixed to the fork 232 branched from the frame 230 of the electric bicycle 200. The rotational force of the electric motor 110 is transmitted to the derailleur 120, which may be formed as a planetary gear device. Accordingly, torque conversion is made by reducing the high speed rotation speed of the motor into a low speed. The converted torque is transmitted to the housing 30, that is, the wheel to rotate the housing 30, thereby achieving forward driving. The derailleur 120 serves to convert a low-torque output into a high-torque output as a reducer that reduces the high-speed rotation speed of the electric motor 110 to a low speed.

Hereinafter, the configuration of the hub type driving device 100 for an electric bicycle according to the present invention will be described in detail.

The housing 30 of the driving device 100 serving as a hub includes a wheel 2 which is installed at the center of the rear wheel 220 and has a cup shape of which one side is opened, and a circular cover 3 having an outer circumferential portion which is sealingly coupled to the opening of the wheel 2. The wheel 2 and the cover 3 may be made of a metal material having a lightweight and strength such as, for example, an aluminum alloy, and a through-hole penetrating the support shaft 1 is formed at the center of the wheel 2 and the cover 3.

Bearing housings are formed inside the through-holes of the cover 3 and the wheel 2, respectively, and first and second bearings 6a and 6b are installed therein so that the housing 30 is rotatably supported around the support shaft 1.

The first bearing 6a protrudes outward to form a bracket 35 for installing a brake device at the center of the cover 3, and the bearing housing is formed on the inner wall of the cover 3. A clutch fixing portion 2a protruding from the inner wall of the wheel 2 fixes a clutch 5 composed of a one-way bearing on the outer circumference thereof, and the inner circumferential portion of the clutch fixing portion 2a serves as the second bearing housing supporting the second bearing 6b.

The wheel 2 has a pair of flange portions 2b and 2c protruding from both sides of the cup-shaped outer circumferential portion, and a plurality of reinforcing portions 30a are connected between the pair of flange portions 2b and 2c to reinforce the strength of the wheel 2. As shown in FIG. 1, the pair of flange portions 2b and 2c of the wheel 2 have a plurality of spoke coupling holes 31 formed therein, in which a plurality of spokes 226 connected to a rim 224 on which a tire 222 is mounted are fixed to the plurality of spoke coupling holes 31.

Figure 8:
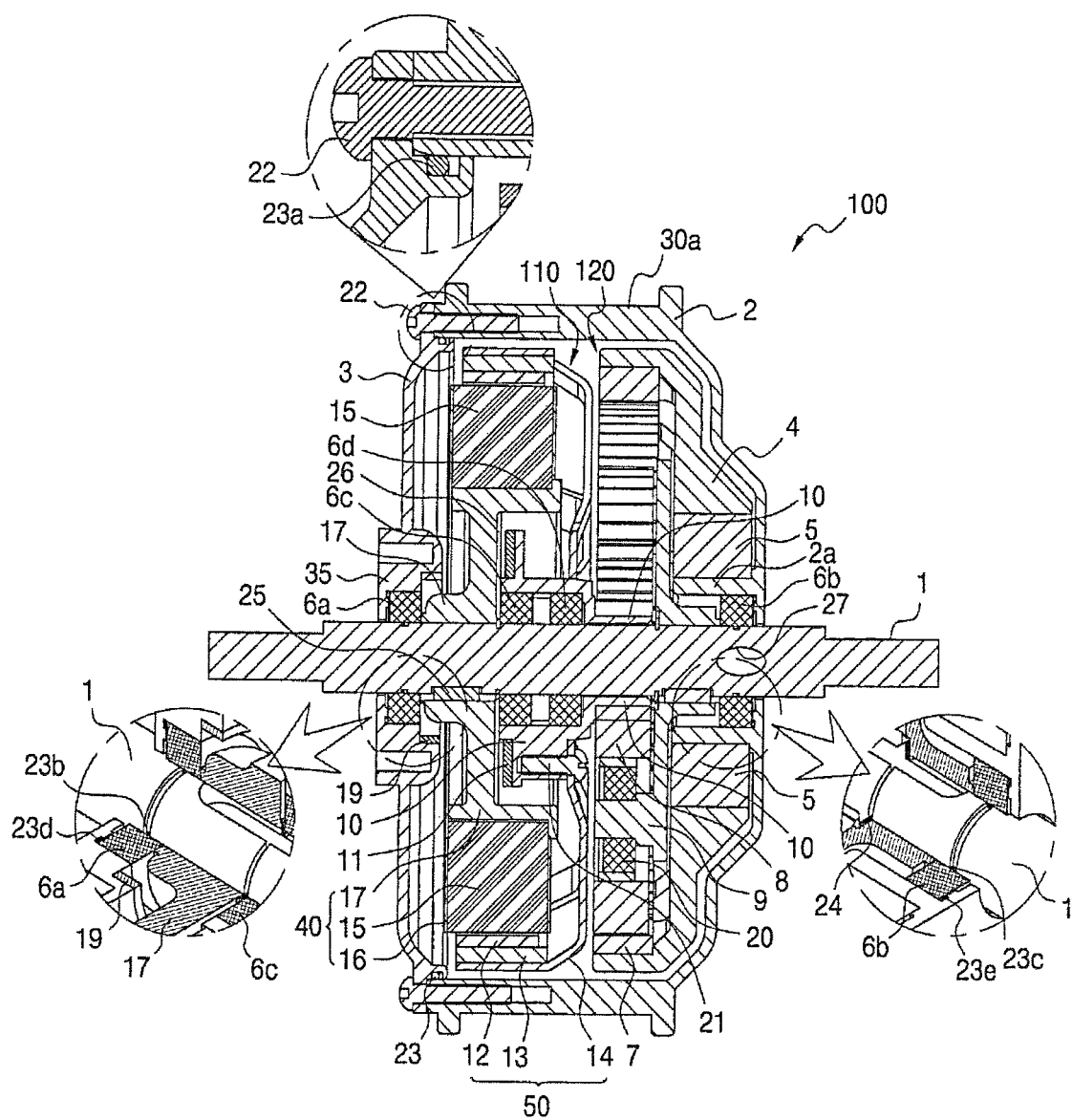
FIG. 8 is a partially enlarged view illustrating a sealing structure in FIG. 3A.

As shown in FIG. 8, grooves are formed on the outer circumferential portion of the cover 3, and an O-ring 23a is inserted into each of the grooves for sealing engagement between the opening of the wheel 2 and the outer circumference of the cover 3. In addition, a plurality of fixing bolts 22 are fastened to maintain an assembling state of the wheel 2 and the cover 3.

In addition, between the first and second bearings each of 6*a* and 6*b* and the support shaft 1 provided in the center of the cover 3 and the wheel 2, sealing O-rings 23*b* and 23*c* are inserted, respectively, and sealing O-rings 23*d* and 23*e* are also inserted between the first and second bearings 6*a* and 6*b* and the bearing housings formed on the inner walls of the cover 3 and the wheel 2, respectively.

In addition, as shown in FIG. 8, the support shaft 1 has a cable passage 27 through which a cable 292 passes in which the cable is provided to transmit a driving signal to the electric motor 110 provided inside the housing 30 from a motor driving circuit of a system controller 290 installed outside the housing 30.

A bracket 35 for installing a brake device for braking the rotation of the housing 30 is protruded from the center outer side of the cover 3 to be integrally formed with the cover 3, and a disk brake may be installed in the bracket 35.

In the illustrated embodiment, the bracket 35 for installing the brake device is integrally formed on the outer surface of the cover 3, but it is also possible to be formed on the outer surface of the wheel 2.

The hub type driving device 100 for an electric bicycle according to the present invention includes an electric motor 110 serving as a power source for generating a rotational force inside the housing 30, and the electric motor 110 may be formed of a brushless DC (BLDC) motor having a radial air gap type, as, for example, an outer rotor type having a single rotor 50 arranged outside a single stator 40.

Although it has been exemplified that the electric motor 110 includes the single stator 40 and the single rotor 50 of the radial air gap type in the above embodiment, the electric motor 110 may be composed of a single stator-double rotor structure or a double stator-double rotor structure.

For example, the electric motor 110 may be driven by a three-phase full-wave driving method, and the rotation position detection of the rotor may be performed by a magneto-electric converting element such as a Hall element.

The central portion of the stator 40 is fixed by a key coupling method using a key 25 on the outer circumference of the support shaft 1, and the rotor 50 is rotated by applying a rotating magnetic field to the rotor 50 according to a motor driving signal applied from the motor driving circuit on the basis of the rotation position detection of the rotor.

The rotor 50 has a main magnet 12 stacked inside a cylindrical back yoke 13, and the cylindrical back yoke 13 is supported inside a rotor bracket 14.

The main magnet 12 may include a plurality of split magnets alternately arranged with an N pole and an S pole, or may employ a split-magnetized cylindrical magnet.

The rotor bracket 14 includes: an outer ring 14*a* for supporting the cylindrical back yoke 13; an inner ring 14*c* connected, by a plurality of fixing bolts 21, an extension portion 10*a* extending from the sun gear 10 forming the derailleur 120; and a plurality of bridges 14*b* for connecting between the outer ring 14*a* and the inner ring 14*c*.

The rotor 50 is arranged at a predetermined distance from the inside of the wheel 2 of the housing 30, and the output of the rotor 50 is transmitted to the sun gear 10 of the derailleur 120 through the rotor bracket 14. That is, as the plurality of fixing bolts 21 are coupled between the inner ring 14*c* of the rotor bracket 14 and the extension portion 10*a* of the sun gear 10, to then be coupled with each other, the rotor 50 and the sun gear 10 are rotatably supported together around the support shaft 1.

Figure 3A:
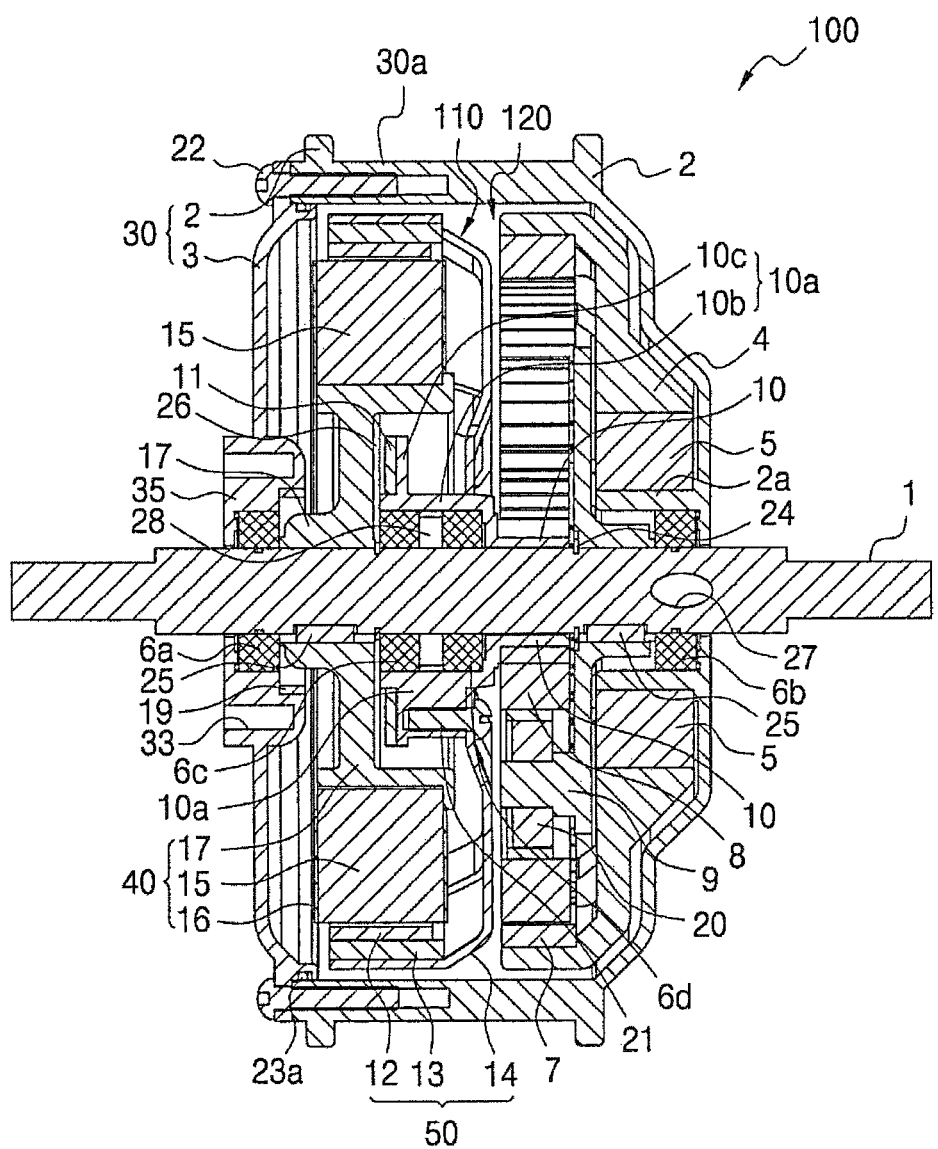
FIGS. 3A and 3B are axial cross-sectional views of a hub type driving device for an electric bicycle according to the present invention.
Figure 3B:
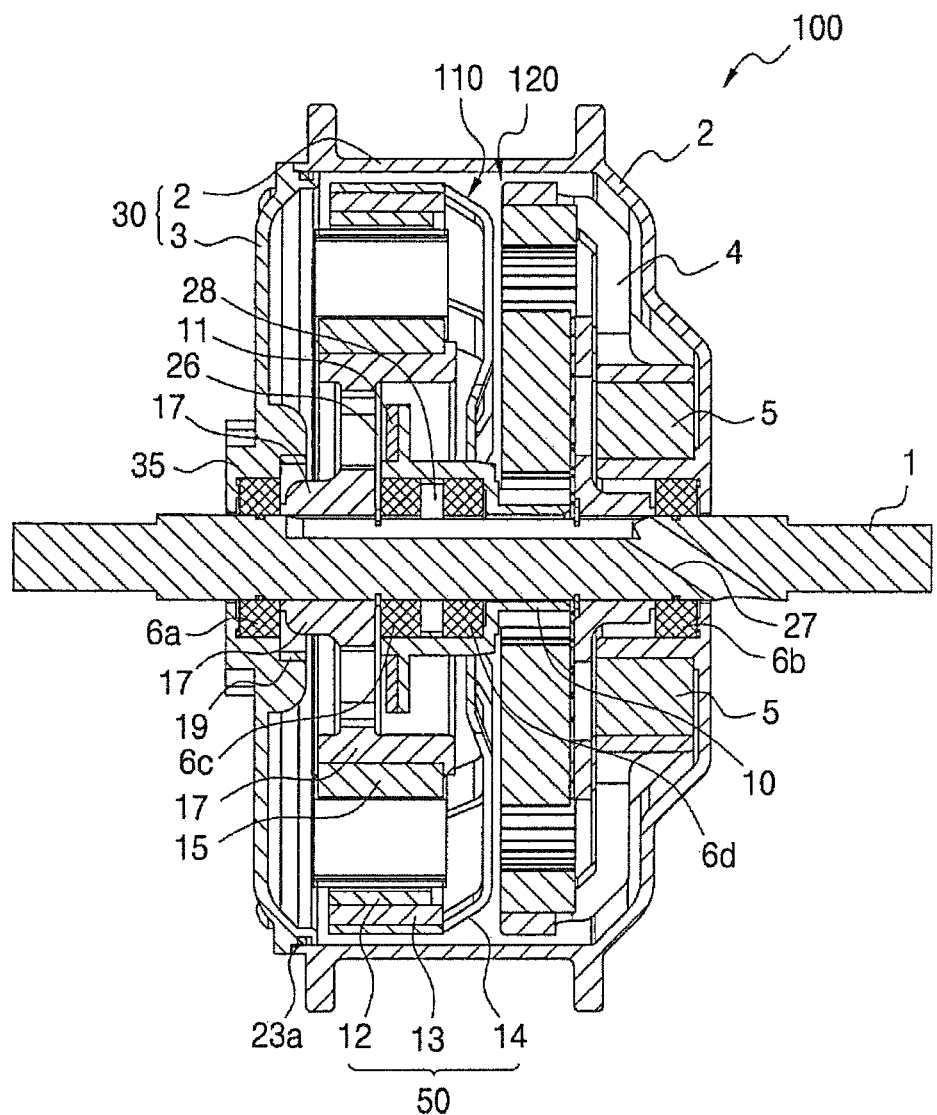
Figure 4:
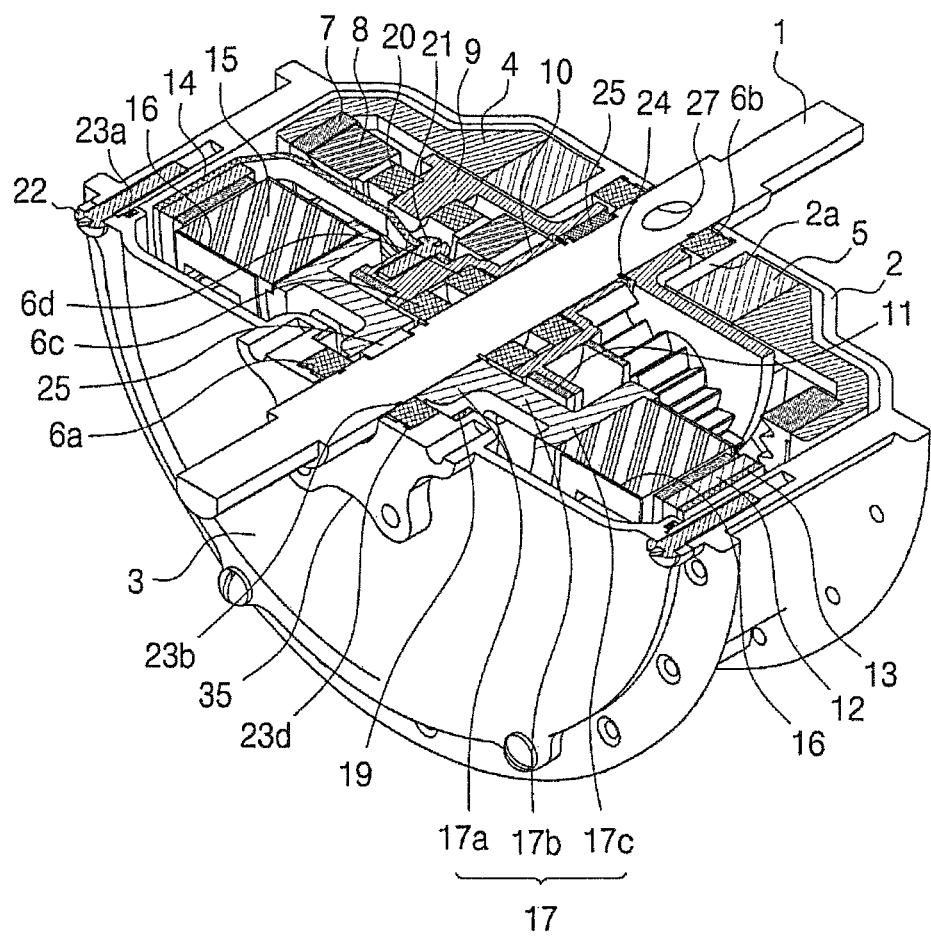
FIG. 4 is a cross-sectional perspective view taken along the axial direction of the hub type driving device for an electric bicycle according to the present invention.

That is, the extension portion 10*a* of the sun gear 10 is formed to have a three-stage bent structure from the sun gear 10 as shown in FIG. 3A. The inner side of a second end bent portion 10*b* surrounding the support shaft 1 serves as a bearing housing, and third and fourth bearings 6*c* and 6*d* are installed on the inner circumference thereof, and the rotor 50 and the sun gear 10 are rotatably supported around the support shaft 1. A spacer ring 28 serving as a spacer is inserted between the third and fourth bearings 6*c* and 6*d* to separate the third and fourth bearings 6*c* and 6*d*. However, the spacer ring 28 may be omitted.

An annular rotor sensing magnet 11 having a plurality of magnetic poles (magnets) corresponding to the main magnet 12 so as to detect the rotational position of the rotor 50 is installed in a third end bent portion 10*c* of the extension portion 10*a* of the sun gear 10 in a direction perpendicular to the support shaft 1. Therefore, the rotor sensing magnet 11 is simultaneously rotated when the rotor 50 rotates.

In addition, a stator assembly bracket 17 facing the rotor sensing magnet 11 is provided with a Hall sensor assembly 26 mounted on a printed circuit board (PCB) with a plurality of Hall sensors spaced apart from each other to detect the rotational position of the rotor when the rotor 50 is rotated.

The inner circumferential portion of the stator 40, which is arranged with an air gap opposite to the main magnet 12 of the rotor 50, is fixedly installed on the support shaft 1.

Figure 10:
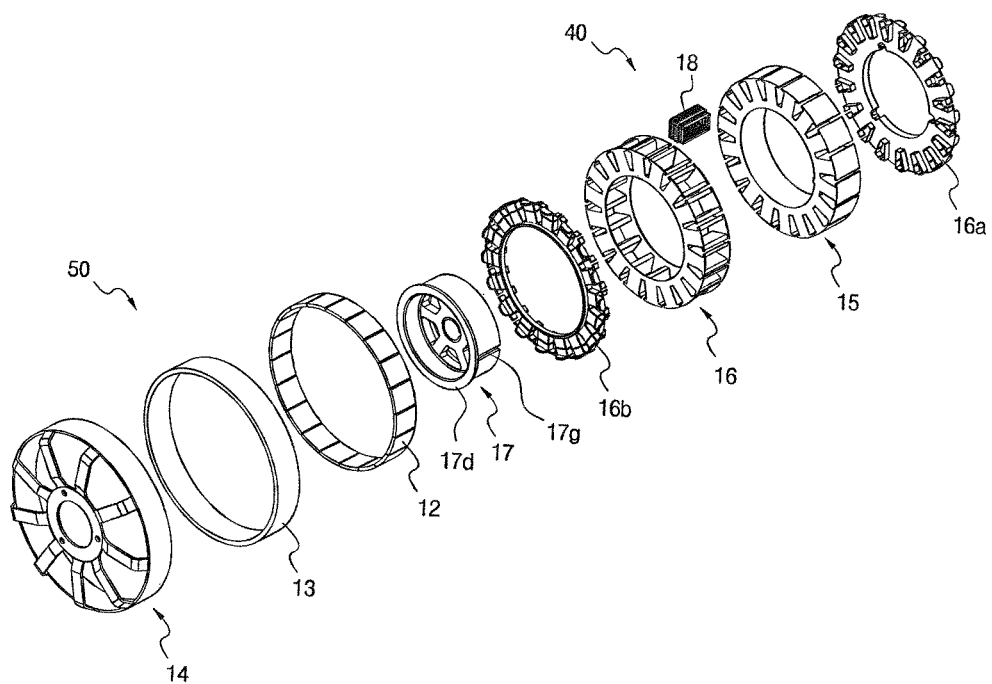
FIG. 10 is an exploded perspective view illustrating an electric motor according to the present invention.

As shown in FIG. 10, the stator 40 according to an embodiment of the present invention includes: a stator core 15; a stator insulating film 16; first and second stator insulators 16*a* and 16*b*; a stator assembly bracket 17; and a stator coil 18.

Figure 9A:
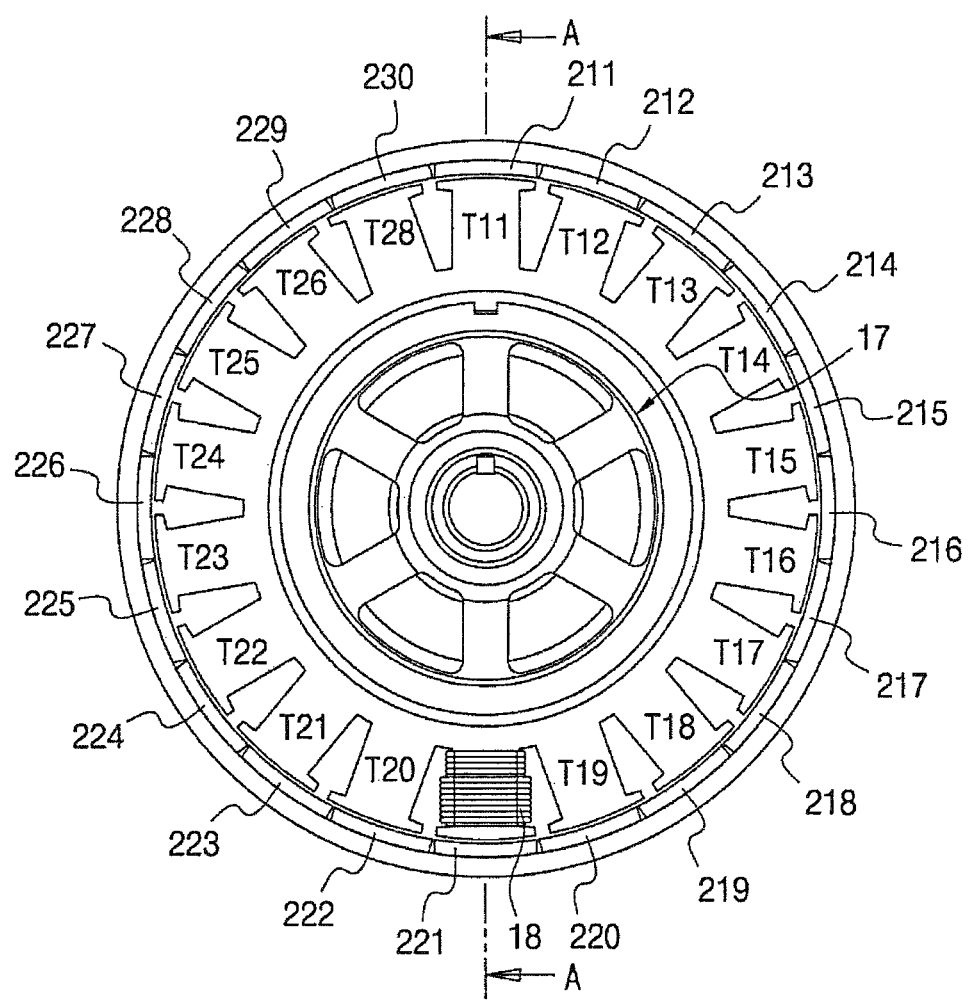
FIGS. 9A to 9C are a left side view, a cross-sectional view taken along line A-A of FIG. 9A, and a diameter-wise cross-sectional view, showing an electric motor according to the present invention.
Figure 9B:
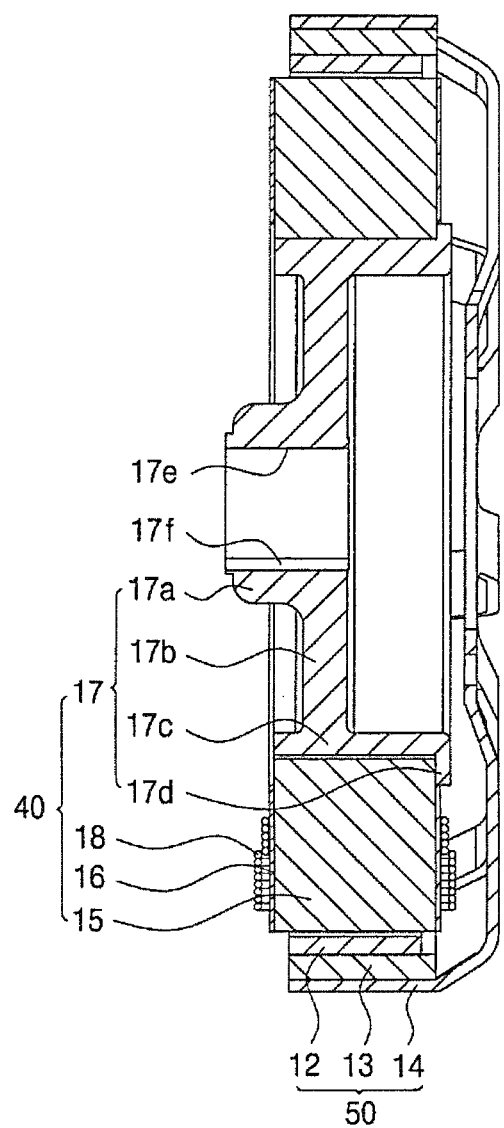
Figure 9C:
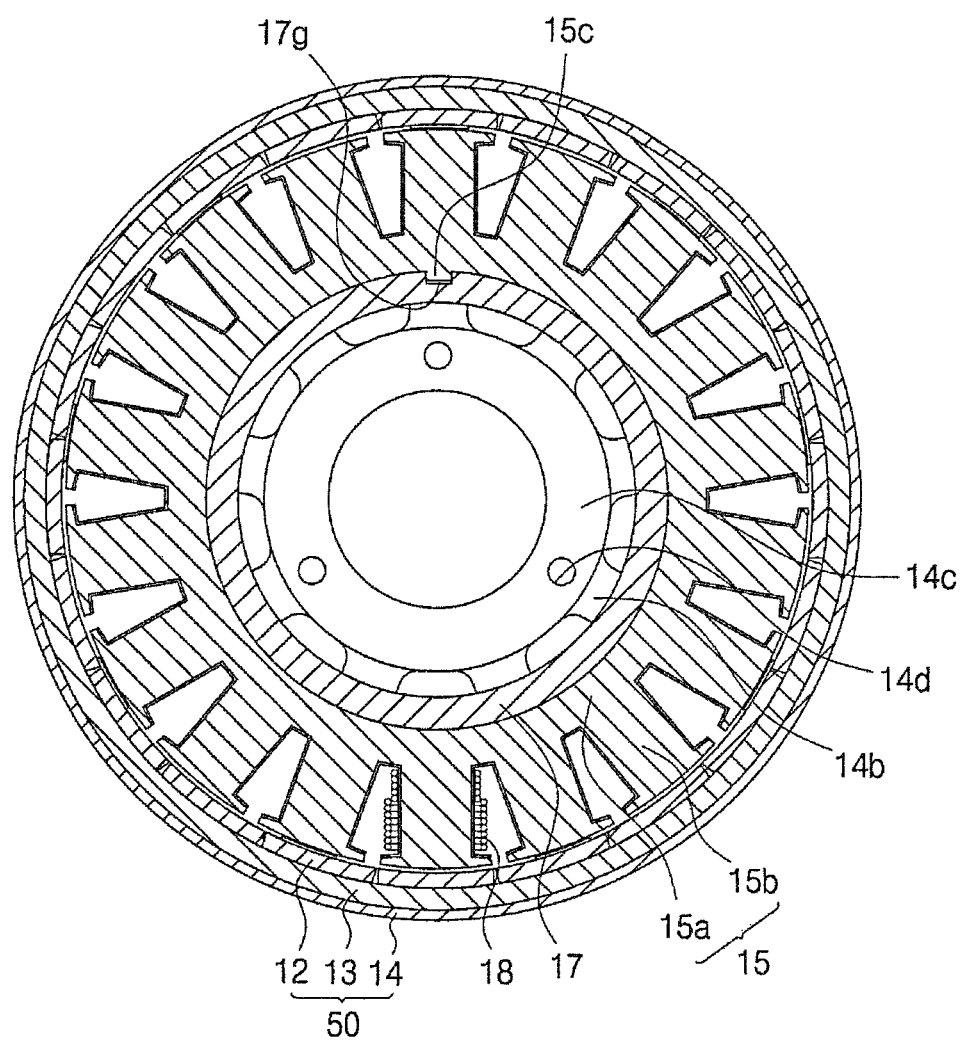

As shown in FIGS. 9A to 9C, the stator core 15 and the stator assembly bracket 17 may be formed separably or integrally.

As shown in FIG. 9C, the stator core 15 has a structure in which a plurality of teeth (i.e., coil winding portions) 15*b* extend radially from a ring-shaped yoke (body) 15*a*.

The teeth 15*b* and the yoke (body) 15*a* of the stator core 15 may be integrated by forming a bobbin and a stator support by insert molding a thermosetting resin, for example, a bulk molding compound (BMC) molding material such as a polyester, or a thermoplastic resin, for insulation, instead of the stator insulating film 16 and the first and second stator insulators 16*a* and 16*b*. In this case, the teeth 15*b* of the stator core 15 may integrally form a bobbin defining a region where the stator coil 18 is wound, except for a portion facing the main magnet 12 of the rotor.

In addition, the insulating bobbin and the stator support may be integrally formed with the stator core 15, or may have a structure in which the three-phase (U, V, W) stator coil 18 is wound after the bobbin is separately formed. The stator insulating film 16 and the first and second stator insulators 16*a* and 16*b* perform the same function as the insulating bobbin and the stator of the stator.

When the stator insulating film 16 is assembled to the stator core 15, the stator insulating film 16 may be formed of an insulating film of a thin film having a substantially rectangular shape so as to surround four sides except the outer circumferential surface facing the main magnet 11 of the rotor, and maintains an insulation state when the coil 18 is wound around the teeth 15*b*.

The first and second stator insulators 16*a* and 16*b* are assembled on both sides of the stator core 15 to cover the plurality of teeth 15*b* and the annular yoke 15*a* on one side and the other side when the coil 18 is wound around the teeth 15*b*, and are fixed in a fit-coupling manner. The first and second stator insulators 16*a* and 16*b* maintain an insulation state together with the stator insulating film 16 when the coil 18 is wound around the teeth 15b.

The first and second stator insulators 16a and 16b include an annular body and a plurality of extension protrusions extending radially from the annular body so as to correspond to the plurality of teeth 15b and the annular yoke 15a, respectively.

In addition, the first stator insulator 16a has an annular extension portion extending in the inner direction of the annular body. Furthermore, when the three-phase (U, V, W) coil 18 is connected to the first stator insulator 16a in a star connection (i.e., a Y-wiring) method, a common terminal for forming a neutral point may be insert-molded so that three common terminal may protrude to the upper portion of the first stator insulator 16a.

The annular body of the first stator insulator 16a may include a plurality of winding guide protrusions that serve as a guide when moving to other teeth or changing a winding direction while maintaining tension to wind the coil on the other teeth after winding in any one of the teeth 15b as necessary.

In addition, the U-phase, the W-phase, and the V-phase terminals (UT, WT, VT) connected to the three-phase (U, V, W) output of an inverter circuit 150 (see FIG. 11D) may be arranged at certain intervals on the annular body of the first stator insulator 16a.

The U-phase, W-phase and V-phase terminals (UT, WT, VT) may be connected internally to the first stator insulator 16a with one of three bus bar fixing nuts, respectively. The three bus bar fixing nuts are fastened to bolts for bus bars, respectively. Therefore, the three-phase (U, V, W) output of the inverter circuit 150 may be stably connected to the U-phase, the W-phase, and the V-phase terminals (UT, WT, VT) as the three-phase (U, V, W) output of the inverter circuit 150 is introduced into the housing 30 through the cable 292 and then connected to the bolts for three bus bars.

The wire wound on the teeth to form the stator coil 18 may include, for example, a polyurethane enameled wire (UEW) coated with polyurethane on the outer circumference thereof, or a polyesterimide enameled wire (EIW) coated with polyesterimide on the outer circumference thereof.

The stator 40 may be connected to the three-phase (U, V, W) stator coil 18 after the three wires transmitting the three-phase (U, V, W) driving signals required for driving the motor from the outside of the housing 30 are embedded in one cable and introduced into the housing 30, respectively.

In this case, the driving device 100 according to the present invention may be configured in a split-core manner in which the three-phase (U, V, W) stator coils 18 are wound by using a plurality of split cores instead of an integral stator core 15, and a stator support is simultaneously formed while being integrated annually using a molding resin.

When the stator core 15 and the stator assembly bracket 17 are separated as in the embodiment shown in FIG. 10, the stator insulation film 16 and the first and second stator insulators 16a and 16b are assembled to the stator core 15, and then the stator 40 can be assembled with the stator assembly bracket 17 by fit-coupling in a state that the three-phase (U, V, W) stator coils 18 are wound on the teeth 15b. That is, as shown in FIG. 9C, a coupling recess 17g is formed in the outer circumference of the stator assembly bracket 17 in parallel with the axial direction, and a coupling protrusion 15c is formed in the inner circumference of the stator core 15 in parallel with the axial direction so as to be coupled to the coupling recess 17g.

In this case, the stator assembly bracket 17 is made of a metal material and has a structure in which the outer ring 17c and the inner ring (boss) 17a are connected by the plurality of bridges 17b. The stator assembly bracket 17 may be manufactured by a die casting method using, for example, an aluminum alloy, or may be formed by a powder metallurgy method using a tungsten material.

The plurality of bridges 17b are biased to one side to form a recess inside the stator assembly bracket 17 and are positioned to connect the outer ring 17c and the inner ring (boss) 17a. An extension portion 10a of the sun gear 10 is extended in the recess to receive the third bearing 6c and the fourth bearing 6d therein, and the rotor sensing magnet 11 is arranged on the outer side thereof.

Further, the inner ring (boss) 17a protrudes toward the cover 3 to secure a wide contact area when engaged with the support shaft 1.

The stator assembly bracket 17 serves as a connection portion for fixing the stator 40 to the support shaft 1. To this end, a key coupling recess 17f is formed in the through-hole 17e located at the center of the stator assembly bracket 17 so as to be coupled to the outer circumference of the support shaft 1 by a key coupling method using a key 25.

As shown in FIG. 3A, the stator assembly bracket 17 may be fixedly coupled to the support shaft 1 by a spline coupling method in addition to the case that the inner ring (boss) 17a is fixed to the support shaft 1 using the key 25.

In addition, the stator 40 according to the present invention may use an integrated core frame in which the stator core 15 and the stator assembly bracket 17 are integrated with each other, and may be formed by stacking a plurality of silicon steel sheets of a thin film. The integrated core frame has a structure in which the plurality of teeth 15b are radially extended on the outer circumference of the annular yoke 15a, and the inner ring (boss) 17a coupled to the support shaft 1 is connected to the inner side of the annular yoke 15a through the plurality of bridges 17b.

The electrical bicycle hub type driving device 100 according to the present invention can be configured to include, for example, an electric motor 110 of a BLDC structure composed of, for example, a 20-pole single rotor 50 and a 18-slot structure single stator 40. The stator 40 has three-phase (U, V, W) stator coils 18 wound around the teeth 15b of the stator core 15, and a drive signal may be transmitted to be applied to the three-phase (U, V, W) stator coils 18, by cable from the motor drive circuit installed outside or inside the housing 30, for example, in a 6-step control manner.

When the electric motor 110 of the BLDC structure is driven by a three-phase (U, V, W) drive mode, the rotational position of the rotor (50) can be detected, for example, by using a Hall sensor as a rotor position detection element. To this end, the rotor sensing magnet 11 is provided on the extension 10a of the sun gear 10, and the rotational position of the rotor 50 can be detected by the Hall sensor assembly 26 located opposite the sensing magnet 11 when the rotor 50 is rotated.

The rotor sensing magnet 11 has, for example, a magnet structure that rotates simultaneously with the rotor 50, and has a 20-pole split-magnetized magnet structure with the same polarity as a main magnet 12 of the rotor 50, and the magnet of the same polarity is placed at the same rotational angle as the main magnet 12.

When the rotor position detecting element for detecting the position signal of the rotor adopts a three-phase driving method, for example, two or three Hall elements can be used. The Hall sensor assembly 26 has a structure in which three Hall sensors and peripheral circuit elements are mounted on a printed circuit board (PCB) and may be attached and secured to a position facing the rotor sensing magnet 11, for example, a stator assembly bracket 17.

The hall sensor assembly 26 is configured so that the Hall element detects changes in magnetic poles of the rotor sensing magnet 11, which rotates synchronously when the rotor 50 rotates, and transmits the detected changes in magnetic poles to the motor driving circuit.

When the Hall element of the Hall sensor assembly 26 detects and transmits a change in magnetic poles of the rotor sensing magnet 19, the control unit of the motor driving circuit generates a drive signal based on a logical table of the 6-step control scheme shown in Table 1 below.

Also, a housing sensing magnet 19 is provided in the center inner side of the cover 3, and the Hall sensor assembly 26 is equipped with a Hall element for detecting the rotation of the housing sensing magnet 19. Therefore, when the cover, i.e., the housing 30 rotates, the result of whether the cover, i.e., the housing 30 rotates is detected and transmitted to the system controller 290 of the electric bicycle.

The system controller 290 calculates the rotational speed of the housing 30 as the Hall sensor assembly 26 detects the number of rotations of the housing sensing magnet 19. When the driving device 100 for the electric bicycle is applied to an electric bicycle of a PAS mode, the driving of the electric motor 110 is controlled to maintain the maximum speed of the electric bicycle at less than 25 km/h.

The operation of the electric motor according to the present invention will be described with reference to FIGS. 9A to 11D.

The electric motor 11) according to this invention includes, for example, an 18-slot 20-pole motor with the stator 40 and the rotor 50 spaced outside the stator 40. The illustrated embodiment illustrates for example an outer rotor motor with the rotor 50 placed outside the stator (40), but this invention, in contrast, may also apply to an inner rotor motor with the rotor placed inside the stator.

The rotor 50 may be implemented in a structure in which magnets (i.e., poles) 211-230 having a plurality of, or twenty (20) different polarities (N-poles and S-poles) are sequentially attached to the back yoke 13 in an annular form.

As shown in FIGS. 9A and 9C, the stator core 15 may be implemented as an integral stator core in which a plurality of or eighteen (18) teeth (T11-T28) having a T-shape are radially extended from an annular yoke 15*a*, or as a plurality of or eighteen (18) split cores which form an annular yoke by forming front end portions thereof in a T-shape, or assembling and connecting rear end portions thereof to each other.

In the present invention, the coils are wound around the stator 40 and the stator core 15 which forms a magnetic circuit path may use either an integral core or split cores, as mentioned above.

Thus, for convenience of explanation, the teeth, split cores, or slots formed between teeth and teeth are used in the same sense, except in special cases, with the same member numbers (T11-T28).

The number of magnets (poles) and the number of teeth (slots) implementing the rotor (50) included in a single-rotor BLDC electric motor may have various combinations in addition to 18 slots and 20 poles.

Hereinafter, a method of designing a motor (hereinafter, referred to as a three-wire connection structure motor) in which coils are alternately wound around three adjacent teeth according to the present invention will be described.

First, when designing a three-wire connection structure motor according to the present invention, the slots of the stator and the magnets (poles) of the rotor may be set at a ratio of, for example, 18 slots to 20 poles. Therefore, according to the present invention, the ratio of the number of slots and the number of poles is 10% or so. Therefore, cogging occurring in the rotation of the rotor is greatly reduced compared to the one-wire connection method, and the gap between the core and the core (i.e., the slot and the slot) is set to be narrow, thereby increasing the effective area facing between the magnet and the core (i.e., teeth) to increase efficiency.

The rotor 50 includes N-pole magnets 211, 213, 215, 217, 219, 221, 223, 225, 227 and 229, and S-pole magnets 212, 214, 216, 218, 220, 222, 224, 226, 228, 230, which are alternately arranged and is provided with an annular back yoke 13 disposed on the outer circumference to form a magnetic circuit path between adjacent magnets.

Figure 11A:
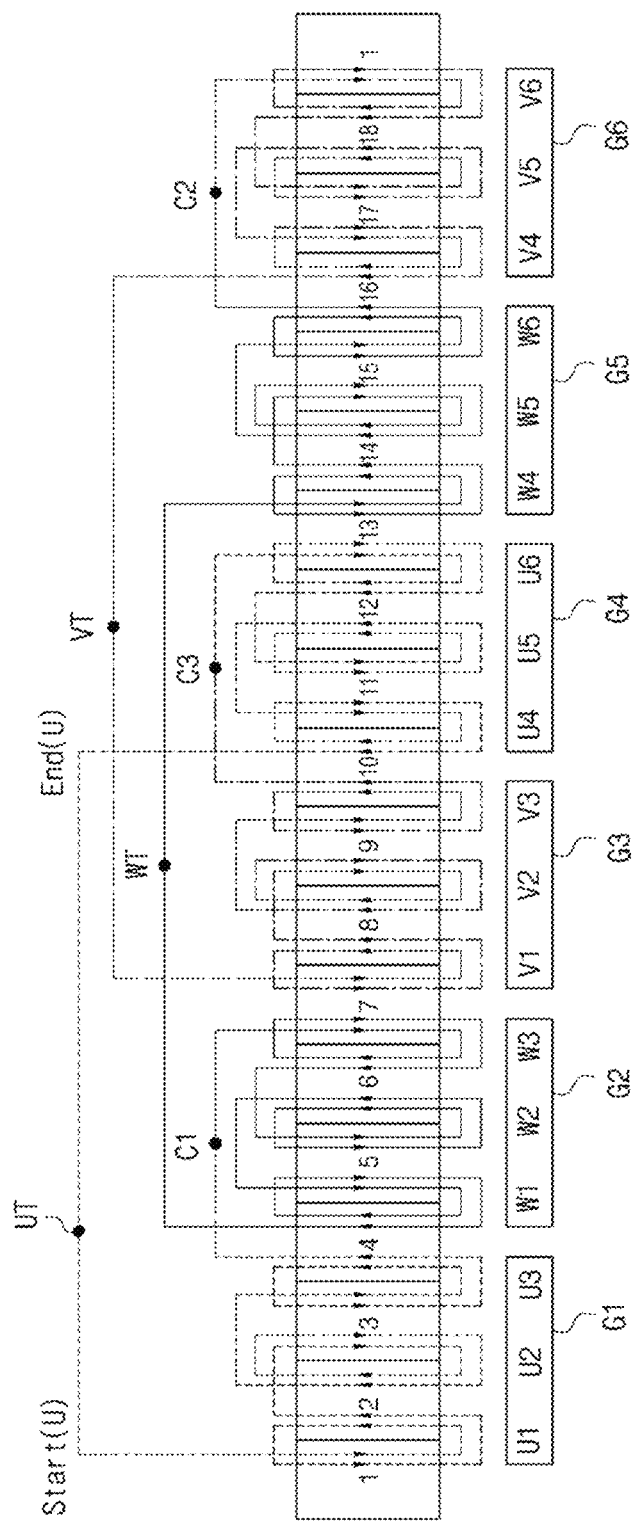
FIGS. 11A to 11D respectively illustrate a diagram for explaining a method of winding a three-phase coil in a three-wire connection manner in a stator core according to the present invention, an equivalent circuit diagram of the three-phase stator coil, which is wound according to the winding method of FIG. 11A, an explanatory diagram showing a coil wiring diagram in which a three-phase coil is wound in a three-wire connection manner in the stator core shown in FIG. 9B, and a circuit diagram illustrating the coil wiring diagram of the three-phase stator coil and a motor driving circuit.
Figure 11B:
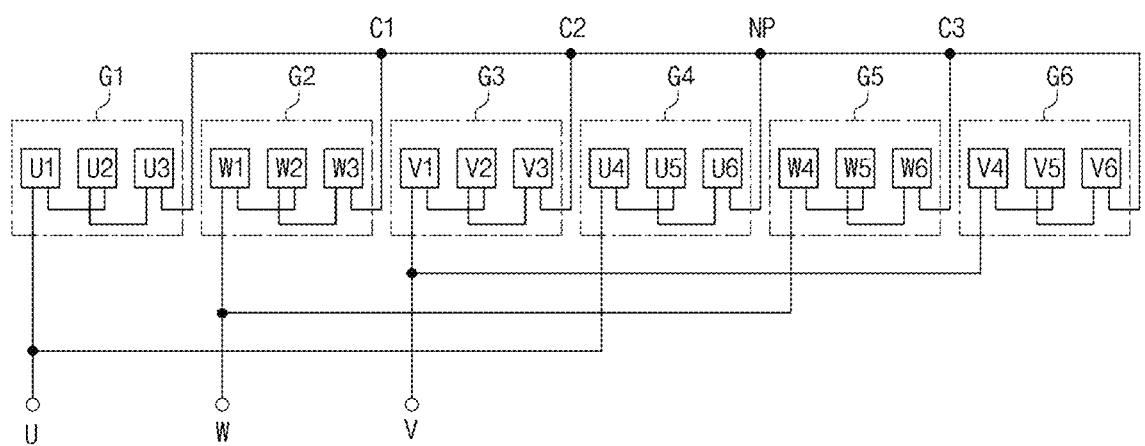

When the stator 40 is a 18-slot and 20-pole structure, the three-phase (U, V, W) stator coil 18 includes six coils (U1-U6, W1-W6, V1-V6) for each phase of U, V, and W, as shown in FIGS. 11A-11 D. Coils (U1-U6, W1-W6, V1-V6) of each phase of U, V and W are wound continuously on three adjacent teeth to form a single core group, forming six first to sixth core groups (G1-G6) as a whole.

If the stator includes 27 slots, multiple of 9, each phase contains nine coils (U1-U9, V1-V9, W1-W9) and the coil is wound continuously on three adjacent teeth to form nine core groups (G1-G9).

Figure 11C:
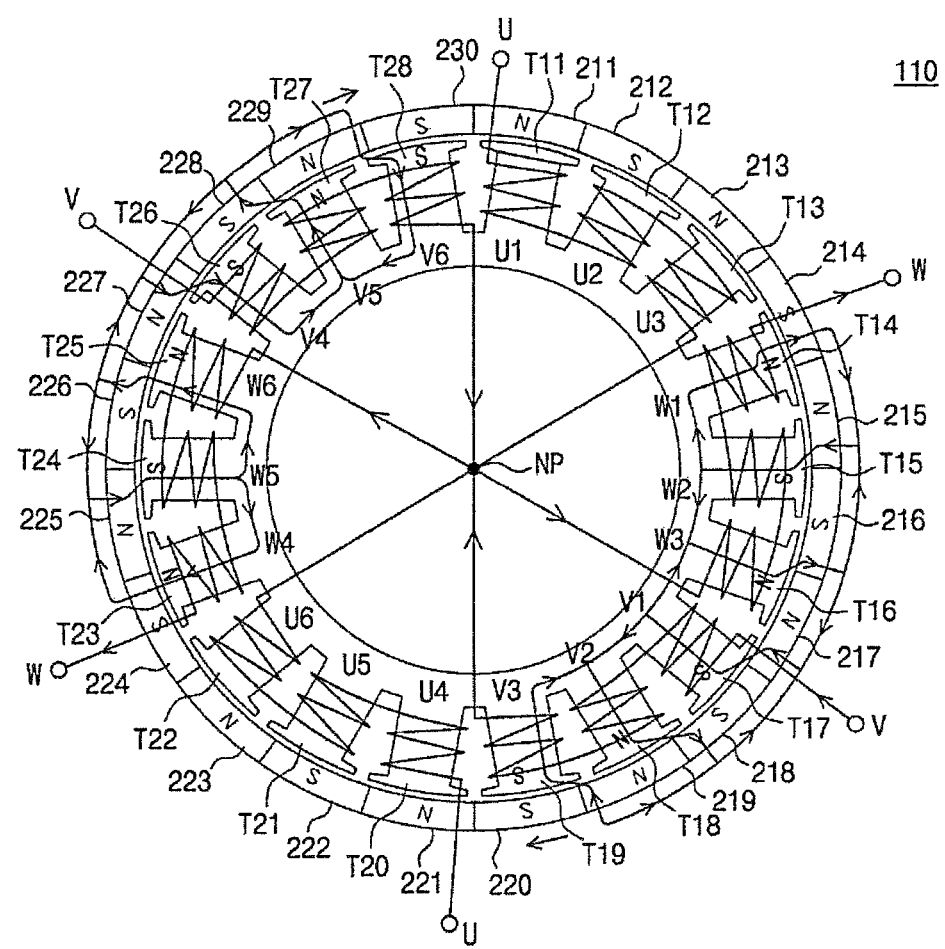

As shown in FIGS. 11A to 11D, each of the core groups (G1 to G6) are continuously sequentially wound on three teeth of the 18 teeth (T11-T28) to be arranged in an annular form in the stator core 15. As a result, as shown in FIG. 11C, the first core group (G1) and the fourth core group (G4) on the U-phase, the second core group (G2) and the third core group (G3) on the W-phase, and the third core group (G3) and the sixth core group (G6) on the V phase are arranged at positions opposite to each other on the basis of the center of the stator core 15.

Figure 11D:
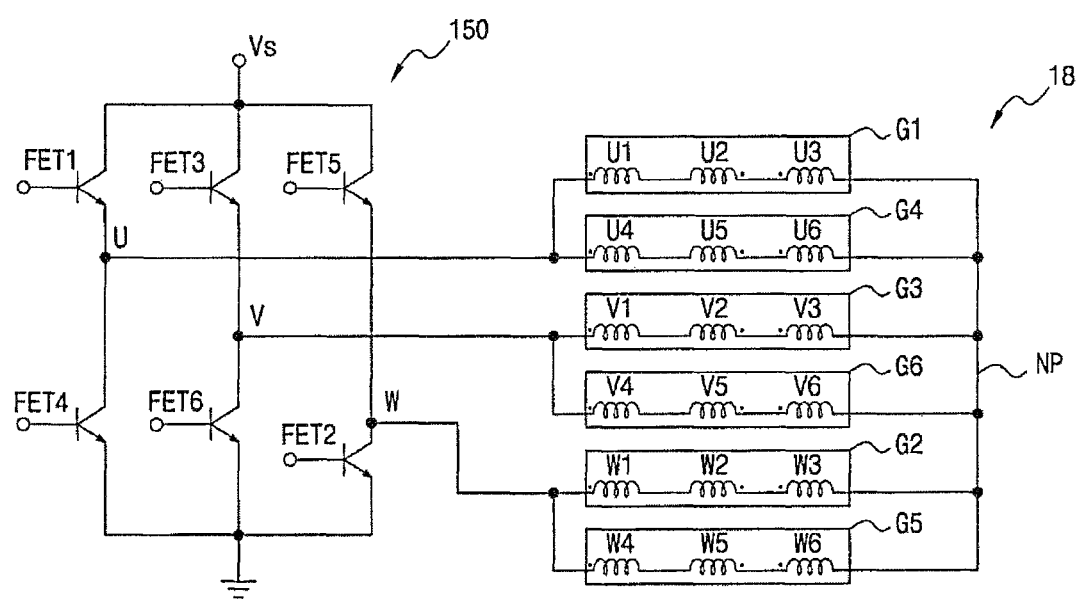

In addition, the stator (40) of this invention connects three-phase (U, V, W) stator coils (U1-U6, W1-W6, V1-V6) in a Y-wiring manner. As shown in FIG. 11D, the stator coils (U1-U6, W1-W6, V1-V6) on each phase of U, V and W form a neutral point (NP) when one side (start terminal) of each phase is connected to the U, V, and W outputs of the inverter circuit 150 constituting the motor driving circuit, and the other sides (end terminals) of each phase are connected to each other.

In this case, when the three-phase (U, V, W) coils (U1-U6, W1-W6, V1-V6) are connected in the Y-wiring manner, a common terminal for forming a neutral point (NP) is insert-molded into the first stator insulator 16*a*. Three common terminals protrude from the common terminal to the upper portion of the first stator insulator 16*a*, and the other sides (end terminals) of each phase may be connected to three common terminals.

In addition, when the six core groups (G1 to G6) that are wound continuously on three adjacent teeth are, for example, coils (U1-U3) of the U-phase core group (G1), the wires are wound in forward, backward, and forward directions on the teeth (T11-T13), and thus each of the teeth in each core group generates a magnetic flux in the mutually opposite direction.

Further, in the 18th teeth (T11-T28) of the whole stator 40, to generate a magnetic flux in the mutually opposite direction between adjacent teases, an optional driving signal is generated from a controller (not shown) of the motor driving circuit and applied to the three-phase coils (U1-U6, W1-W6, V1-V6) through the inverter circuit 150.

Coils (U1-U6, W1-W6, V1-V6) on each phase of the U, V and W form a neutral point (NP) when two core groups are connected in parallel and thus the input of each core group is commonly connected to the U, V and W outputs of the inverter circuit 150 and the output of each core group is connected to three common terminals (C1-C3).

That is, in the case of the coils (U1-U6) on the U-phase, the inputs and outputs of the first core group (G1) consisting of the three coils (U1-U3) and the fourth core group (G4) consisting of the three coils (U4-U6) are commonly connected, respectively. Identically even in the case of the W-phase coils (W1-W6) and the V-phase coils (V1-V6), the inputs and outputs of the second core group (G2) consisting of three coils (W1-W3) and the fifth core group (G5) consisting of three coils (W4-W6) are commonly connected, respectively, and the third core group (G3) consisting of three coils (V1-V3) and the sixth core group (G6) consisting of three coils (V4-V6) are commonly connected, respectively.

As shown in FIG. 11C, in the case of the stator 40 wound by the three-wire connection method according to this invention, the coils (U1-U6, W1-W6, V1-V6) of each phase of U, V, and W is wound around the 18 teeth (T11-T28) so that the first to sixth core groups (G1 to G6) are sequentially arranged.

In this invention, as shown in FIG. 11A, after winding the first core group (G1) of the U-phase on the teeth (T11-T13) using one wire, the second core group (G2) of the W-phase is wound on the teeth (T16-T14). Subsequently, after winding the fifth core group (G5) of the W-phase on the teeth (T23-T25) using one wire, the sixth core group (G6) of the V-phase is wound on the teeth (T28-T26). Subsequently, after winding the third core group (G3) of the V-phase on the teeth (T17-T10) using one wire, the fourth core group (G4) of the U-phase is consecutively wound on the teeth (T22-T20). In doing so, coil winding is completed.

As described above, in the present invention, one wire is used to start a winding for the U-phase first core group (G1) on the teeth (T11), and continuously perform a winding until when to terminate a winding for the U-phase fourth core group (G4) on the teeth (T20), and thus the coil winding is completed.

As a result, the present invention does not require any connection between the coils wound on six teeth in the same phase and between the coils in the other phases.

In this case, the winding directions of the coils wound in the three teeth included in each of the core groups (G1-G6) follow forward, reverse, and forward for performing winding. In addition, after winding the coils (U1, U2, U3) of the first core group (G1) on the U-phase, the coils (W3, W2, W1) of the second core group (G2) on the W-phase, are wound in the direction of the teeth (T14) in front of the teeth (T16). In the same way, coils are wound on the fifth core group (G5) on the W-phase, the sixth core group (G6) on the V-phase, the third core group (G3) on the V-phase and the fourth core group (G4) on the U-phase.

In addition, in the process of moving from the coil (U3) of the first core group (G1) on the U-phase to the coil (W3) of the second core group (G2) on the W-phase, each one end of the first core group (G1) and the second core group (G2) should be naturally connected to the neutral point (NP) by undergoing a single winding step on one of the three common terminals (C1-C3) by wire wrapping.

In this case, the wires wound on the teeth to form the coils adopt, for example, a polyurethane enameled wire (UEW), which is coated with polyurethane on the outer circumference thereof, a polyesterimide enameled wire (EIW), which is coated with a polyesterimide, or a polyester enameled wire (PEW), which is coated with polyester. Accordingly, when soldering is performed after wire wrapping on a common terminal (COM), electrical connection between the wire and the common terminal (COM) is facilitated.

As described above, the present invention is capable of making coil windings without a connection portion as all the coil windings are continuous at a time, when winding a three-phase coil on the teeth of an integrated stator core by means of a three-wire connection method.

However, the coil winding method of the present invention is not limited thereto, but it is possible to divide and wind the coils on the teeth. Two core groups adjacent to each other, e.g., six adjacent teeth, may be wound by a continuous winding method so that the six adjacent teeth are divided into three sections by two core groups (G1, G2; G3, G4; G5, G6) and wound over three times.

As described above, in the case of the electric motor 110 according to the present invention as illustrated in FIG. 11D, as the inputs and outputs of the first core group (G1) and the fourth core group (G4) on the U-phase are commonly connected, respectively, the inputs and outputs of the second core group (G2) and the fifth core group (G5) on the W-phase are commonly connected, respectively, and the third core group (G3) and the sixth core group (G6) on the V-phase are commonly connected, respectively, the coils of each phase have a parallel connection structure, and thus the resistance of the stator coil 18 can be minimized.

In addition, in the present invention, when the three-phase coils (U1-U6, W1-W6, V1-V6) are wound around the teeth (T11-T28) of the stator core, the winding may be performed using two strands of wires of a thin diameter. In this case, since the inputs and outputs of each core group (G1-G6) are commonly connected to the U-phase, W-phase and V-phase terminals (UT, WT, VT) and the common terminals (C1-C3), the resistance of the stator coil 18 can be minimized by configuring the parallel circuit.

Generally, the resistor (R) is proportional to the length (L) and is inversely proportional to the cross-sectional area (S). Therefore, the overall resistance of the stator coil 18 having a parallel connection between the respective core groups is reduced to approximately one-half as compared to the serial connection structure. As a result, copper loss (coil loss) is a phenomenon caused by heat generation of energy ($P=I^2R$) when current (I) flows through a conductor that is a resistance (RΩ), and energy loss causes temperature rise.

As a result, according to the present invention, as the resistance of the stator coil 18 decreases, the resistance and the coil loss are reduced, thereby lowering the coil temperature and increasing efficiency. In addition, it is possible to lower the resistance of the stator coil 18 to increase power in the driving device requiring instantaneous power.

In addition, according to the present invention, a thin wire is wound in a two-strand winding manner, thereby realizing a desired high speed RPM by securing a desired coil turn number, thus improving the performance of the driving device.

The operation of the electric motor (110) designed according to the three-wire connection method of this invention will be described in Table 1 below with reference to FIGS. 11A to 11D above. Table 1 below is a logical table of the control unit (not illustrated) provided in the motor driving circuit applied when the switching elements (FET1-FET6) of the inverter circuit 150 is selectively activated when the BLDC electric motor 110 is driven by a 6-step control mode.

TABLE 1

| | Electrical angle | | | | | | |
|---|---|---|---|---|---|---|---|
| | 0° | 60° | 120° | 180° | 240° | 300° | 360°, 0° |
| | | | Mechanical angle | | | | |
| | 0° | 12° | 24° | 36° | 48° | 60° | 72°, 0° |
| H1 | N | S | S | S | N | N | N |
| H2 | N | N | N | S | S | S | N |
| H3 | S | S | N | N | N | S | S |
| Input | V | V | W | W | U | U | V |
| Output | W | U | U | V | V | W | W |
| Upper FET | FET3 | FET3 | FET5 | FET5 | FET1 | FET1 | FET3 |
| Lower FET | FET2 | FET4 | FET4 | FET6 | FET6 | FET2 | FET2 |

The BLDC electric motor 110 shown in FIG. 11C indicates a state when the rotational position of the rotor 50 is 0°, and the corresponding stator coils (U1-U6, V1-V6, W1-W6) are selectively activated to generate a rotation magnetic field by switching the direction of the current flowing through the stator coils (U1-U6, V1-V6, W1-W6) and applying the switched current for each of the machine angle 12° in the 6-step control mode.

The motor driving circuit includes the control unit (not shown) and the inverter circuit 150. The inverter circuit 150 includes three pairs of power switching elements (FET1-FET6) connected in a totem pole to each other, in which an output (U, V, W) of each phase is generated from a connection point between the upper FET (FET1, FET3, FET5) and the lower FET (FET4, FET6, FET2) to be applied to the stator coils (U1-U6, V1-V6, W1-W6) of the BLDC electric motor 110.

When the BLDC electric motor 110 adopts a three-phase driving mode, the stator 40 includes six coils (U1-U3, U4-U6, V1-V3, V4-V6, W1-W3, W4-W6) connected in parallel to each phase as shown in FIG. 11D, and in the case of the Y-wire connection structure, for example, the other ends of the coils are connected to each other to form a neutral point NP.

The BLDC electric motor 110 selectively drives two switching elements of the three pair switching elements connected in a totem pole based on the position signal of the rotor 50, and sequentially applies the current to two coils among the U-phase, V-phase, W-phase coils (U1-U3, U4-U6, V1-V3, V4-V6, W1-W3, W4-W6), to thereby sequentially excite the two-phase stator coils to generate a rotation magnetic field to achieve rotation of the rotor. That is, a driving signal from the output of the inverter circuit 150 is applied to the one-phase coil, and the driving signal is applied to the other-phase coil through the neutral point NP.

When the position signal of the rotor 50 is detected by the Hall elements (H1-H3) at each angle in the control unit (not shown) of the motor driving circuit, the inverter circuit 150 sets a current flow path by turning on a pair of switching elements (FETs) according to Table 1.

For example, when the Hall elements (H1-H3) detect the polarity of the rotor 50 as "N, N, S" as shown in FIG. 11D, the control unit determines that the rotation position of the rotor 50 is 0° in accordance with Table 1, and thus when the driving signal is applied to turn on the FET3 on the upper side and the FET2 on the lower side, the current flows to the ground via the FET3-parallel connection V-phase coil (V1-V3)/(V4-V6)-neutral point-parallel connection W-phase coil (W3-W4)/(W6-W4)-FET2.

Accordingly, the teeth (T17) generate magnetic flux in the inner direction, the teeth (T18) generate magnetic flux toward the outer direction, and the teeth (T19) generate magnetic flux toward the inner direction, so that the magnetic circuit is set as indicated by the arrows, and the rotor 50 rotates clockwise.

That is, a large repulsive force is generated between the teeth (T17-T19) and the rotor 50 as the teeth (T17-T19) in which the V-phase coils (V1-V3) are three-wire connected in the BLDC electric motor 110 of FIG. 11C serve as an electromagnet and the right portion of the teeth is arranged opposite to each other with the same polarities such as S-S, N-N, and S-S between the opposite magnets 218-220 of the rotor 50.

Further, a small attractive force is generated between the teeth (T17-T19) and the rotor 50 as the left portion of the teeth, which has an area which relatively smaller than the right portion of the teeth (T17-T19), is arranged opposite to each other with the opposite polarities such as S-N, N-S, and S-N between the opposite magnets 217-219 of the rotor 50.

Therefore, a small attractive force and a large repulsive force are simultaneously generated between the teeth (T17-T19) and the rotor 50, thereby rotating the rotor 50 in a clockwise direction.

Further, as the V-phase coils (V1-V3) are arranged in the rear end thereof adjacent to the three-wire connected teeth (T17-T19), the respective left portions of the teeth (T14-T16) in which the W-phase coils (W1-W3) are three-wire connected are opposite to each other with opposite polarities, such as N-S, S-N, and N-S between the opposite magnets 214-216 of the rotor 50, and the right portions of the teeth are arranged opposite to each other with the same polarity, such as N-N, S-S, and N-N between the opposing magnets 215-217 of the rotor 50, An attractive force and a repulsive force are generated between the teeth (T14-T16) and the rotor 50 to rotate the rotor 50 in the clockwise direction at the same time.

Furthermore, the same repulsive force and attractive force are generated between the rotor 50 and each of the teeth (T26-T28) in which the V-phase coils (V4-V6) are three-wire connected and the teeth (T23-T25) in which the W-phase coils (W6-W4) are three-wire connected, which are arranged opposite to the teeth (T17-T19) in which the V-phase coils (V1-V3) are three-wire connected and the teeth (T14-T16) in which the W-phase coils (W3-W1) are three-wire connected. Therefore, the rotor 50 is rotated clockwise by the action of pushing and pulling the rotor 50.

Then, the rotor 50 is rotated by 12° at a mechanical angle so that the Hall elements (H1-H3) detect the polarity of the rotor 50 as "S, N, and S". Accordingly, the control unit determines that the rotational position of the rotor 50 is 12° at the mechanical angle in accordance with Table 1. Accordingly, when the control unit applies a driving signal to turn on the FET3 of the upper side and the FET4 of the lower side, the current flows to the ground via FET3-parallel connection V-phase coils (V1-V3)/(V4-V6)-neutral point-parallel connection U-phase coils (U3-U4)/(U6-U4)-FET4.

As described above, the electric motor 110 according to the present invention is configured so that each of the core groups (G1-G6) includes a reverse coil winding in the teeth located in the middle of the three consecutive teeth on each phase of the core groups (G1-G6). In each driving step, two adjacent core groups, i.e., a pair of consecutive six (6) teeth arranged at both ends thereof symmetrically around a rotary shaft, are activated, and three consecutive three (3) teeth arranged between the pair of consecutive six (6) teeth have an inactive state.

For example, as shown in FIG. 11C, when the rotational position of the rotor 50 is 0°, the teeth (T17-T19) in which the V-phase coils (V1-V3) are three-wire connected (i.e., G3), the teeth (T14-T16) in which the W-phase coils (W1-W3) are three-wire connected (i.e., G2), the teeth (T26-T28) in which the V-phase coils (V4-V6) are three-wire connected (i.e., G6), and the teeth (T23-T25) in which the W-phase coils (W4-W6) are three-wire connected (i.e., G5), are set to an active state, and the teeth (T11-T13) in which the U-phase coils (U1-U3) are three-wire connected (i.e., G1), and the teeth (T20-T22) in which the U-phase coils (U4-U6) are three-wire connected (i.e., G4), are set to an inactive state.

In this case, when the driving signal is applied and activated for each of the two adjacent core groups, the six teeth contained in the two core groups generate magnetic flux in opposite directions. In addition, a driving signal is applied from a start terminal of a corresponding coil in one of two adjacent core groups where the activation is performed, and is applied from an end terminal of the corresponding coil in the other core group.

In addition, between the six consecutive teeth that are activated are the rotor 50, the left sides of the teeth are set to the opposite polarities, pulling the rotor 50 in the rotational direction by the attractive force, and the right sides of the teeth are set to the same polarity as each other, pushing the rotor 50 in the rotational direction by the repulsive force.

That is, all three consecutive teeth of the four core groups generate magnetic flux for rotating the magnets of the opposite rotor 50 in the same direction, thereby enabling effective force transmission to the rotor.

In addition, in the present invention, six consecutive teeth are simultaneously activated, and the activated six teeth generate magnetic flux in opposite directions. Accordingly, even when the interface between the adjacent S- and N-pole magnets is placed on the rotor 50 facing the teeth of the stator, an effective magnetic circuit path is established without magnetic flux loss to rotate the rotor 50. As a result, the split-magnetized magnets without rounding of the S-pole and the N-pole magnets adjacent to each other can be used, thereby increasing the effective area of the magnets 211-230 corresponding to the teeth T11-T28 and increasing efficiency.

In addition, in the present invention, a coil winding is formed so that a magnetic flux is generated in a direction opposite to each other between adjacent split cores, and as the driving signal is applied, it is possible to increase the effective area between the magnet and the core (i.e., teeth) without generating magnetic flux leakage due to cogging, even if the slot interval between the teeth and the teeth is set to be small, thereby increasing efficiency.

Conventionally, it has been required the opening width between the slots should be wide and the outer circumferential surface should be rounded (R). However, in the present invention, the respective teeth are not rounded, and even though the curvature is set to coincide with one external circle formed by the entire eighteen (18) teeth, cogging is not greatly generated. As a result, the effective area between the magnet and the core (teeth) is increased to reduce the leakage magnetic flux, thereby increasing efficiency.

The electric motor 110 according to the present invention is capable of making coil windings without a connection portion as all the coil windings are continuous at a time, when winding a three-phase coil on the teeth of an integrated stator core by means of a three-wire connection method. In this case, in the embodiment shown in FIG. 11C, each of the core groups G1 to G6 is wound to be placed on the teeth T11-T28 of the stator core to in a clockwise direction in a G1 to G6 order. However, it is also possible to arrange the core groups in the clockwise direction in the order of G1-G3-G5-G4-G6-G2.

In the embodiment illustrated in FIG. 11A, when the coil is wound around the teeth T11-T28 of the stator core, the winding of the coils in the order of G1-G2-G5-G6-G3-G4 has been illustrated. However, it is also possible to arrange the core groups in the order of G1-G3-G5-G4-G6-G2, and to wound the coils in the order of G1-G2-G5-G3-G6-G4.

In the present invention, as shown in FIG. 11C, instead of placing three winding coils in the order of the U-phase core group, W-phase core group, and the V-phase core group, it is also possible to arrange the three winding coils in the order of the U-phase core group, V-phase core group, and the W-phase core group.

Hereinafter, the configuration of the derailleur 120 in the hub type driving device 100 for an electric bicycle according to the present invention will be described in detail.

The derailleur 120 may be formed of a simple planetary gear device or a multi-stage speed shift device having a fixed ratio shift, as a speed reducer for reducing the high speed rotation speed of the electric motor 110 into a low speed.

The planetary gear device of the fixed ratio shift applied to the derailleur 120 of the hub type driving device 100 for an electric bicycle according to the present invention includes a sun gear 10, a plurality of planetary gears 8, a ring gear 7, and a carrier 9. When the planetary gear device has a sun gear input, a ring gear output, and a carrier fixing structure, a reverse decelerated output is obtained in which a speed reduction ratio is determined by (−) the number of the teeth of the ring gear divided by the number of the teeth of the sun gear.

The derailleur 120 of the present invention transmits the output of the rotor 50 of the electric motor 110 to the sun gear 10 connected to the rotor bracket 14 through the rotor bracket 14. That is, a plurality of fixing bolts 21 are coupled between the inner ring 14c of the rotor bracket 14 and the extension portion 10a extending from the sun gear 10, so that mutual connection is made.

A pair of third and fourth bearings 6c and 6d are installed between the extension portion 10a and the support shaft 1, and a central portion of the sun gear 10 is rotatably coupled around to the support shaft 1, so that when the rotor 50 is rotated by the rotating magnetic field of the stator 40, the sun gear 10 rotates in the same direction as the rotor 50.

Figure 5:
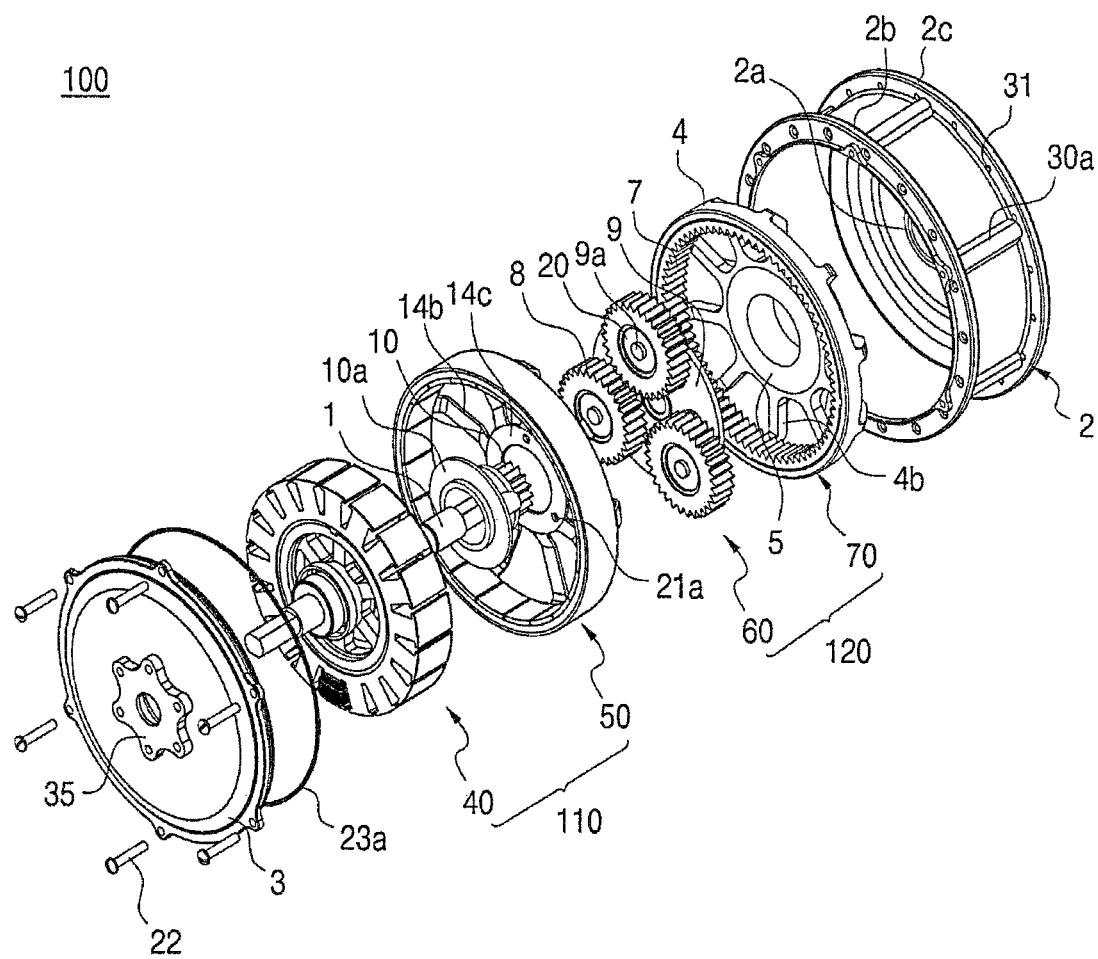
FIG. 5 is a partially exploded perspective view of a hub type driving device for an electric bicycle according to the present invention.
Figure 6:
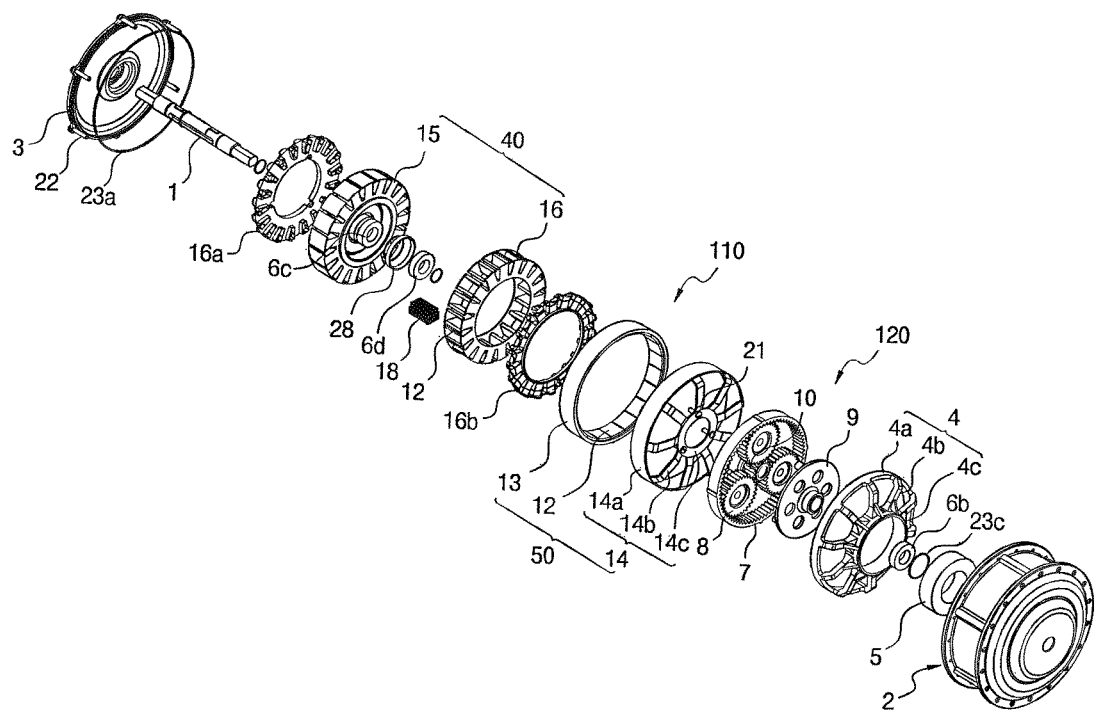
FIG. 6 is a fully exploded perspective view of a hub type driving device for an electric bicycle according to the present invention.
Figure 7:
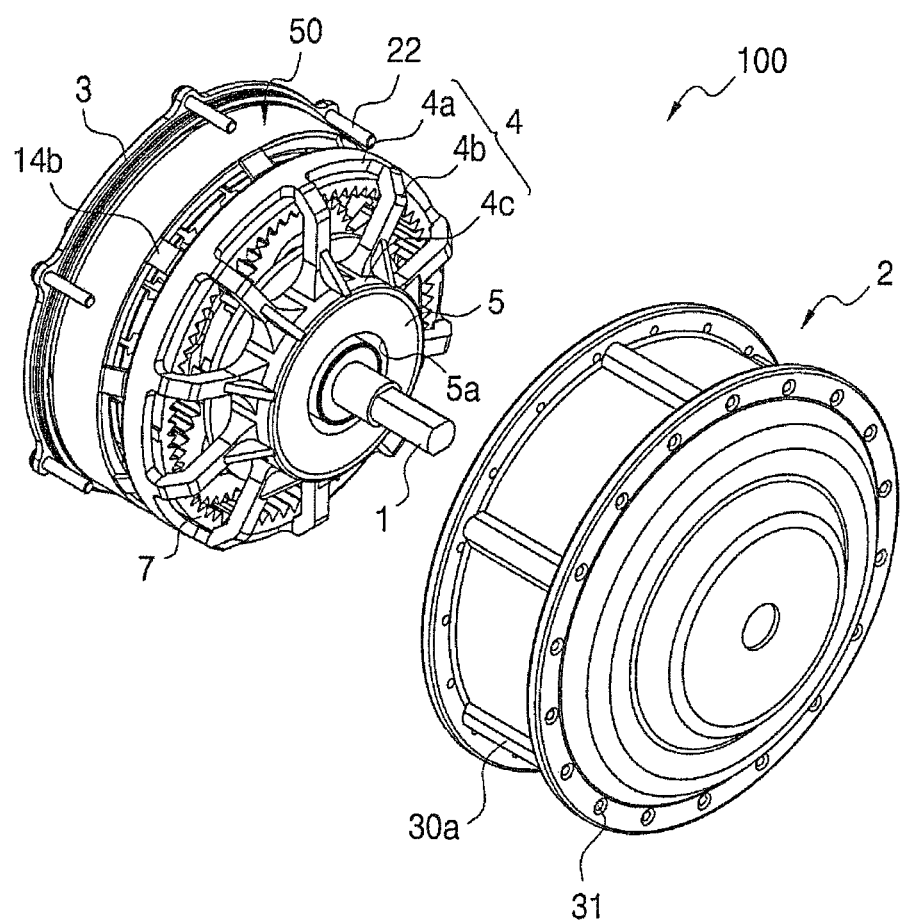
FIG. 7 is an exploded perspective view of a hub type driving device for an electric bicycle according to an embodiment of the present invention, in which a driving device housing of the hub type driving device is separated from the hub type driving device.

The three planetary gears 8 are coupled to the outer circumference of the sun gear 10, the three planetary gears 8 are rotatably supported by bearings 20 on respective rotary shafts 9a, and each one end of the three rotary shafts 9a is fixed to a carrier (i.e., a planetary gear bracket) 9. Accordingly, the three planetary gears 8 and the carrier (i.e., the planetary gear bracket) 9 are integrated as shown in FIG. 5 to form the planetary gear assembly 60.

In addition, the central portion of the carrier (i.e., the planetary gear bracket) 9 is coupled to the outer circumference of the support shaft 1 by a key coupling method using a key 25 so as to prevent the rotation of the carrier.

Therefore, the three planetary gears 8 have a structure that the former can rotate but cannot revolve around the rotary shaft 9a according to the rotation of the sun gear 10, and the three planetary gears 8 rotate in the opposite direction (i.e., in the counterclockwise (CCW) direction) when the sun gear 10 rotates in one direction (e.g., in the counterclockwise (CW) direction).

The three planetary gears 8 are inscribed into and engaged with the ring gear 7, and the outer circumference of the ring gear 7 is coupled to the ring gear bracket 4. The ring gear bracket 4 includes: an outer ring 4a in which the ring gear 7 is accommodated and supported; an inner ring 4c formed as a circle smaller than the outer ring 4a, and a plurality of bridges 4b connecting the outer ring 4a and the inner ring 4c. The ring gear 7 and the ring gear bracket 4 are integrated to form the ring gear assembly 70.

The clutch 5 consisting of a one-way bearing is installed between the inner ring 4c of the ring gear bracket 4 and the annular clutch fixing portion 2a extending to the inner space from the housing 30, that is, the wheel 2 to the inner space. That is, the outer ring of the one-way bearing is connected to the inner ring 4c of the ring gear bracket 4, and the inner ring of the one-way bearing is connected to the clutch fixing portion 2a.

The clutch 5 includes, for example, a structure in which a one-way clutch and a ball bearing are embedded, and the outer ring and the inner ring of the clutch may be installed in the inner ring 4c of the ring gear bracket 4 and the clutch fixing portion 2 a in a press-fit or key-fixing manner. In addition, the one-way clutch may also adopt a cam clutch.

When the rotation (for example, in the CW direction) of the three planetary gears 8 occurs, the ring gear 7 and the ring gear bracket 4 rotate in the same direction (in the CW direction) as the planetary gears 8.

Hereinafter, the operation of the hub type driving device 100 for the electric bicycle according to the present invention will be described.

First, a throttle-mode electric bicycle is an electric bicycle having a throttle, such as an accelerator, mounted therein, in which a driver can arbitrarily control the output of the motor.

In the case that the driving device 100 of the present invention is applied to a throttle-mode electric bicycle, when a user operates a power switch in an operation panel 284 of the electric bicycle 200 to turn on the electric motor 110, and then operates the accelerator 282 installed in the handle of the electric bicycle to accelerate the electric bicycle, the rotor 50 and the rotor bracket 14 rotate in the CW direction at the same time, according to the operation of the electric motor 110, and in synchronization thereto, the sun gear 10 of the derailleur 120 rotates clockwise about the support shaft 1.

Accordingly, the three planetary gears 8 gear-coupled to the sun gear 10 are rotated in the CCW direction, and the ring gear 7 and the ring gear bracket 4 gear-engaged with the three planetary gears 8 are rotated in the same CCW direction as the planetary gears 8.

The rotation of the ring gear bracket 4 in the CCW direction rotates the wheel 2, that is, the housing 30 in the CCW direction, through the clutch 5 formed of a one-way bearing.

As described above, the derailleur 120 is composed of a simple planetary gear device having an input of the sun gear 10, an output of the ring gear 7, and a fixing structure of the carrier 9, and a reverse decelerated CCW direction output for the CW direction output of the electric motor 110 is obtained the speed reduction ratio is determined by (−) the number of the ring gear teeth/the number of the sun gear teeth.

As a result, a rim 224 and a tire 222 connected through the housing 30 and the plurality of spokes 226 are rotated in the CCW direction, so that the electric bicycle 200 is driven in the forward direction.

The throttle mode electric bicycle 200 increases the rotational speed of the electric motor 110 in proportion to the operation of the accelerator 282, thereby increasing the driving speed of the electric bicycle since the rotational speed transmitted to the housing 30 via the derailleur 120 increases in proportion thereto.

Meanwhile, after the user gets off the electric bicycle 200, when the electric bicycle is parked at the parking place, the electric bicycle can be advanced with the human force while turning the electric motor 110 in the turn-off state.

In this case, when the electric bicycle is advanced in the turn-off state of the electric motor 110, the housing 30 rotates in the CCW direction, and the clutch 5, which is composed of a one-way bearing rotated in the same direction as the housing 30, does not transmit the rotational force of the housing 30 to the ring gear bracket 4 but block the same.

As a result, when the electric bicycle 110 is turned off, even if the electric bicycle is advanced, the clutch 5 blocks the rotation of the ring gear bracket 4 and the ring gear 7 so that the planetary gear device of the derailleur 120 and the electric motor 110 remain stationary.

Further, after the user gets off the electric bicycle while the user turns off the electric motor 110, the housing 30 is rotated in the CW direction when the electric bicycle is moved backward with the human force. In this case, the clutch 5 transmits the CW direction rotation force of the housing 30 to the ring gear bracket 4, and the plane gears 8 also rotate in the CW direction according to the CW rotation of the ring gear bracket 4 and the ring gear 7. The sun gear 10 rotates in the CCW direction around the support shaft 1 by the CW direction rotation of the planetary gears 8.

The CCW direction rotation of the sun gear 10 rotates the rotor bracket 14 and the rotor 50 of the electric motor 110 in the CCW direction at the same time, thereby causing the rotor 50 to act as a load. However, such low speed backward movement does not cause damage to the driving device or does not cause noise.

As described above, in the present invention, the ring gear 7 and the ring gear bracket 4 are separated from the housing 30, and the ring gear bracket 4 and the clutch fixing portion 2a protruding from the housing 30 are connected with the clutch 5 formed of a one-way bearing. Accordingly, the output of the ring gear 7 is transmitted to the housing 30 only when the electric motor 110 is turned on, and the rotation force of the housing 30 is prevented from being transmitted to the ring gear 7 when the motor 110 is stopped (turned-off) even if the housing 30 rotates forward.

As a result, in the present invention, when the user parks the electric bicycle in the parking place after the user stops the electric bicycle in the motor stop state, or when the battery is consumed or the user performs the pedaling in accordance with the user's needs, that is, when the electric bicycle is advanced in the forward direction, that is, when the housing 30 is rotated in the forward direction, the rotation of the ring gear 7 can be blocked, and the gears of the planetary gear apparatus may be prevented from being damaged or from being noisy.

In addition, the driving device 100 of the present invention can be applied to an electric bicycle having a pedal assist system (PAS) mode and a throttle and PAS combination mode, in addition to a throttle mode.

In the case that the driving device 100 of the present invention is applied to the PAS mode electric bicycle, when a power switch is operated in the operation panel 284, a mode is selected according to a road driving environment, and a pedal effort is applied to the pedal 240 by a user, the pedal effort is applied to the pedal 240 is measured by, for example, a torque sensor installed in the crank shaft 252, and the measured pedal effort is transmitted to the system controller 290.

When the pedal effort is detected by the torque sensor, the system controller 290 turns on the electric motor 110. The PAS mode electric bicycle 200 measures the pedal effort applied to the pedal 240 and the greater the pedal effort applied to the pedal, the greater the system controller 290 increases the output of the electric motor 110. As a result, the rotational speed transmitted to the housing 30 via the derailleur 120 is also in proportion to the output increase of the electric motor 110, and the driving speed of the electric bicycle 200 is also increased.

Therefore, the PAS mode electric bicycle 200 can actively control the output of the electric motor 110 of the electric bicycle by controlling the pedal effort applied to the pedal 240 by the rider.

In addition, when driving uphill, the torque sensor measures the pedal effort applied to the pedal 240 to increase the output of the electric motor 110 of the electric bicycle, thus maintaining the same driving speed as flat driving.

In addition, when the Hall sensor installed in the Hall sensor assembly 26 detects the rotation of the housing sensing magnet 19 and transmits the detected rotation to the system controller 290, the rotation speed of the electric motor 110, that is, the driving speed of the electric bicycle 200, is calculated, based thereon, and the result value is displayed on the operation panel 284.

The PAS mode electric bicycle is regulated to drive the bicycle road when the highest driving speed is less than 25 km/h. Therefore, in order to meet the bicycle road driving requirements for the PAS mode electric bicycle 200, the system controller 290 can control the rotation speed of the electric motor 110, that is, to stop the operation of the electric motor 110 or to control the driving speed of the electric bicycle not to exceed 25 km/h when the running speed of the electric bicycle exceeds 25 km/h, based on the rotation detection of the housing sensing magnet 19 detected by the Hall sensor installed in the Hall sensor assembly 26.

In addition, in the PAS mode electric bicycle, in the state in which the power switch is turned off (turned-off mode to completely block the support of the electric motor), when the user parks the electric bicycle in the parking place after the user gets off the electric bicycle, or when the battery is consumed or the user performs the pedaling in accordance with the user's needs, that is, when the electric bicycle is advanced in the forward direction, the rotational force of the housing 30 is blocked by the clutch 5 from being transmitted to the ring gear bracket 4 and the ring gear 7. As a result, the planetary gear device of the derailleur 120 and the electric motor 110 maintain a stationary state and prevent the gear from being damaged or noisy.

Further, after the user gets off the electric bicycle while the user turns off the electric motor 110, the housing 30 is rotated in the CW direction when the electric bicycle is moved backward. In this case, the clutch 5 transmits the CW direction rotation force of the housing 30 to the ring gear bracket 4, and the plane gears 8 also rotate in the CW direction according to the CW rotation of the ring gear bracket 4 and the ring gear 7. The sun gear 10 rotates in the CCW direction around the support shaft 1 by the CW direction rotation of the planetary gears 8.

The CCW direction rotation of the sun gear 10 rotates the rotor bracket 14 and the rotor 50 of the electric motor 110 in the CCW direction at the same time, thereby causing the rotor 50 to act as a load. However, such low speed backward movement does not cause damage to the driving device or does not cause noise.

INDUSTRIAL APPLICABILITY

The driving device of the present invention can be applied to an electric bicycle having a throttle mode, a pedal assist system (PAS) mode, and a throttle and PAS combination mode.

What is claimed is:

1. An electric bicycle including a pedal assist system (PAS) mode comprising:
   a hub type driving device including:
      a housing having an accommodation space therein;
      a support shaft for penetrating so as to pass through the housing and of which both ends are fixed to a fork of the electric bicycle;
      first and second bearings which are installed between both ends of the housing through which the support shaft penetrates and rotatably supports the housing around the support shaft;
      an electric motor which is embedded in the housing and generates a rotational force rotated around the support shaft, the electric motor including:
         a housing sensing magnet installed in the housing to be used for detecting a driving speed of the electric bicycle;
         a hall sensor assembly installed in a stator of the electric motor and having a hall sensor for detecting rotation of the housing sensing magnet rotated together with the housing to generate a driving speed detection signal;
      a derailleur for decelerating the rotational force of the electric motor; and
      a clutch for selectively transmitting an output of the derailleur to the housing,
      wherein the derailleur is formed of a planetary gear device of a sun gear, a carrier, and a ring gear, wherein one end of a ring gear bracket is coupled to the ring gear, and the ring gear is coupled to the clutch through the other end of the ring gear bracket, and
      the clutch is a one-way bearing supported the ring gear bracket and an inner ring of the one-way bearing being supported on a clutch fixing portion protruding from the housing,
   a torque sensor installed on a crank shaft to detect a pedal effort applied to a pedal; and a system controller for controlling a system of the electric bicycle according to a user's selection, and wherein the system controller controls the electric motor so that the driving speed calculated on the basis of the driving speed detection signal does not exceed a predetermined speed.

2. The electric bicycle of claim 1, wherein the ring gear and the ring gear bracket are separated from the housing, and the clutch transmits an output of the ring gear bracket to the housing when the electric motor is operated, and blocks the transmission of a forward rotational force of the housing to the ring gear bracket when the electric motor is stopped.

3. The electric bicycle of claim 1, wherein the electric motor is composed of a brushless direct-current (BLDC) motor, an output of a rotor is transmitted to the sun gear of the planetary gear device through a rotor bracket, the sun gear is rotatably supported on the support shaft, and the carrier is fixed to the support shaft.

4. The electric bicycle of claim 3, wherein the rotor includes back yokes and magnets stacked on an outer ring of the rotor bracket, the electric motor further comprises: a stator having an outer circumferential portion facing the magnets of the rotor via an air gap and applying a rotating magnetic field to the rotor, and an inner ring of the rotor bracket is connected to an extension portion extending from the sun gear.

5. The electric bicycle of claim 4, further comprising third and fourth bearings for rotatably supporting the rotor bracket and the sun gear around the support shaft between an inner circumferential portion of the extension portion and the support shaft.

6. The electric bicycle of claim 4, wherein the stator comprises: a stator core in which a plurality of teeth are radially extended on an outer circumference of an annular yoke; an insulating film surrounding four sides of the plurality of teeth except an outer circumferential surface opposite to the magnets of the rotor; first and second stator insulators having an annular body and a plurality of extension portions radially extending from the annular body so as to correspond to the plurality of teeth and the annular yoke, respectively, and assembled to one side and the other side of the stator core; a stator coil wound around.

7. The hub type driving device for an electric bicycle of claim 6, wherein the stator core and the stator assembly bracket are integral.

8. The electric bicycle of claim 4, wherein the stator includes three-phase (U, V, W) stator coils wound on a plurality of teeth, and each of the three-phase (U, V, W) stator coils includes a plurality of core groups wound continuously in three teeth, wherein the core groups on each phase are connected in parallel and are alternately arranged for each phase.

9. The electric bicycle of claim 1, wherein: the electric motor includes a 20-pole single rotor and a single stator having an 18-slot structure; the single stator includes three-phase (U, V, W) stator coils wound on the plurality of teeth, wherein each of the three-phase (U, V, W) stator coils includes a plurality of core groups that are continuously wound on three teeth; each of the core groups is continuously wound in a sequence of forward, backward, and forward directions in three consecutive teeth, and six consecutive teeth of two adjacent phases generate magnetic flux in opposite directions to rotate magnets of opposite rotors in the same direction; and when a driving signal is applied to the stator coils in a 6-step control manner, the six consecutive teeth of two phases are set to an active state, and three consecutive teeth on a remaining one phase arranged between activated six teeth are set to an inactive state.

10. The electric bicycle of claim 1, wherein: the electric motor includes a 20-pole single rotor and a single stator having an 18-slot structure; the single stator includes three-phase (U, V, W) coils wound on eighteen teeth, wherein each of the three-phase (U, V, W) coils includes six core groups that are continuously wound on three teeth; the three-phase (U, V, W) coils wound around the eighteen teeth is completely wound with a one-time continuous winding, an input of the core groups on each phase is commonly connected to a terminal on each phase, and an output of the core groups on each phase is wound to be connected to a common terminal for forming a neutral point.

11. The electric bicycle of claim 1, further comprising: a frame; a front wheel connected to one end of the frame; and a rear wheel connected to another end of the frame; and wherein the hub type driving device that is installed on a front wheel hub or a rear wheel hub to provide a rotational driving force for the front wheel or the rear wheel.

* * * * *